(12) United States Patent
Granstrom et al.

(10) Patent No.: US 7,119,995 B2
(45) Date of Patent: Oct. 10, 2006

(54) ESD SHUNT FOR TRANSDUCING HEAD

(75) Inventors: Eric L. Granstrom, Golden Valley, MN (US); James G. Wessel, Savage, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 458 days.

(21) Appl. No.: 10/763,834

(22) Filed: Jan. 22, 2004

(65) Prior Publication Data
US 2005/0162785 A1    Jul. 28, 2005

(51) Int. Cl.
*G11B 5/127* (2006.01)
(52) U.S. Cl. ...................................... 360/323
(58) Field of Classification Search ............... 720/683; 360/323; 324/249, 252, 207.21
See application file for complete search history.

(56) References Cited

U.S. PATENT DOCUMENTS

| | | | |
|---|---|---|---|
| 4,801,558 A | 1/1989 | Simmons et al. | |
| 5,465,186 A | 11/1995 | Bajorek et al. | |
| 5,514,940 A * | 5/1996 | Okamoto | 318/469 |
| 5,638,237 A | 6/1997 | Phipps et al. | |
| 5,757,590 A | 5/1998 | Phipps et al. | |
| 5,847,899 A * | 12/1998 | Fukuda et al. | 360/97.01 |
| 5,903,415 A * | 5/1999 | Gill | 360/323 |
| 6,377,411 B1 * | 4/2002 | Katsumata et al. | 360/46 |
| 6,400,534 B1 | 6/2002 | Klaassen | |
| 6,424,505 B1 * | 7/2002 | Lam et al. | 360/323 |
| 6,538,857 B1 * | 3/2003 | Doss et al. | 360/323 |
| 6,671,137 B1 * | 12/2003 | Ajiki et al. | 360/323 |
| 6,678,127 B1 * | 1/2004 | Hsiao et al. | 360/323 |
| 6,710,983 B1 * | 3/2004 | Voldman | 360/323 |
| 6,914,758 B1 * | 7/2005 | Ryan et al. | 360/323 |
| 6,944,937 B1 * | 9/2005 | Hsiao et al. | 29/603.09 |
| 6,972,930 B1 * | 12/2005 | Tang et al. | 360/234.5 |
| 6,972,933 B1 * | 12/2005 | Wada et al. | 360/323 |
| 2002/0044392 A1 | 4/2002 | Bougtaghou et al. | |
| 2002/0066177 A1 | 6/2002 | Takada et al. | |
| 2002/0083576 A1 | 7/2002 | Hsiao et al. | |
| 2003/0151858 A1 | 8/2003 | Hsiao et al. | |
| 2003/0169540 A1 | 9/2003 | Granstrom et al. | |

* cited by examiner

*Primary Examiner*—Allen Cao
(74) *Attorney, Agent, or Firm*—Kinney & Lange, P.A.

(57) ABSTRACT

A transducing head includes a sensor element having a plurality of terminal pads and a shunt electrically connected with the sensor element in parallel for protecting the sensor element from electrical damage during fabrication of the transducing head. The shunt includes one or more fuses, where the shunt configured to be repeatedly tested around during fabrication to allow testing of the sensor element. The shunt is structured to be permanently electrically removable prior to operation of the transducing head by directing a shunt removal current through the shunt which effectively creates an open circuit in the shunt without causing a damaging current to flow in the sensor element. In another embodiment, the transducing head includes a shunt electrically connected with the sensor element in parallel. The shunt includes a plurality of removable resistive elements, each resistive element having an element resistance, and an adjustable transducing head resistance defined by the sensor resistance and the element resistances. Sequential removal of some or all of the resistive elements establishes a desired transducing head resistance.

30 Claims, 15 Drawing Sheets

IMPEDANCE VS FREQUENCY FOR BAND EXCLUDE SHUNT

ESD SHUNT FOR TRANSDUCING HEAD

BACKGROUND OF THE INVENTION

The present invention relates to the field of electrical protection circuitry, and more particularly to removable ESD shunts for protection of transducing heads against electrostatic discharge and electrical overstress during fabrication and testing.

Hard disc drive (HDD) systems are widely used for data storage and retrieval. A HDD system typically includes a magnetic storage medium, such as a rotatable magnetic disc, and a read/write transducing head. In operation, the magnetic disc rotates while the read/write transducing head, supported by a slider, "flies" above a surface of the rotating disc on a small cushion of air located at and air bearing surface (ABS) of the transducing head. The transducing head and slider are positioned relative to the disc by a spring-loaded suspension attached to an actuator arm. The small cushion of air works in conjunction with spring bias force from the suspension to maintain the transducing head at a substantially constant distance from the rotating disc, generally at a distance of about 10 nanometers.

The transducing head typically includes a reader and a writer. Currents and voltages generally do not damage the writer. The reader, however, includes a read element, such as a magnetoresistive (MR) sensor element comprising a number of layers, which is highly sensitive to electrostatic discharge (ESD) and electrical overstress (EOS). ESD specifically refers to an actual discharge, whereas EOS refers to a voltage or current in the element larger than that intended under normal operating conditions; however, as used hereinafter, the terms are intended to contain each other.

Many varieties of MR sensor elements are known, but all MR sensor elements have relatively small physical sizes, allowing use of the MR sensor element with magnetic discs having a greater areal density of recorded data. For example, an MR sensor element used for high recording densities will have a cross-section of about 500 Angstroms (Å) by 0.1 micrometers ($\mu$m) or smaller. The small size of the MR sensor element makes the MR sensor element particularly susceptible to damage from ESD or EOS. Discharges having a voltage of less than a volt through such a physically small MR sensor element are capable of damaging or destroying the MR sensor element. Numerous types of damage to the MR sensor element are possible, including: destruction of the MR sensor element by thermal breakdown due to melting, evaporation, or diffusion of the layers of the MR sensor element; contamination of an air bearing surface of the transducing head; the creation of shorts by electrical breakdown; and other forms of transducing head performance degradation.

ESD occurs, for example, when charged objects, equipment, or persons contact or nearly contact the transducing head, causing triboelectric charging of the transducing head. Materials such as plastics can cause significant charge accumulation, which can destroy a transducing head upon a discharge between materials and the transducing head.

ESD and EOS are particularly problematic during fabrication of the HDD. Transducing heads are initially fabricated as part of a wafer that contains, for example, about 20,000 transducing heads. Various manufacturing processes are performed on the transducing heads during wafer-level fabrication. Individual transducing heads are then separated from the wafer and mounted on a suspension. The suspension is assembled in a head stack assembly (HSA), which is then assembled in the HDD.

It is desired to test a transducing head at various stages of HDD fabrication. Testing allows detection of defective transducing heads prior to assembly in an HDD, thereby reducing waste and expense otherwise generated when additional manufacturing processes are performed on assemblies that include a defective transducing head.

Klaassen, U.S. Pat. No. 6,400,534, discloses a magnetoresistive head assembly with a shunt system, whereby standard guarded measurements of a transducing head are taken to test the MR sensor element at various stages of the manufacturing process. However, the shunt is not integrated with the transducing head and is not electrically removable without damage to the transducing head.

Phipps et al., U.S. Pat. No. 5,638,237, discloses a removable shunt system. The shunt system does not disclose testing of a transducing head after the shunt system has been installed.

Moreover, known means for electrical removal of the shunt generate a pulse which can cause damage to the magnetoresistive head. Shunts including two or more fuses generate damaging pulses as the fuses breakdown non-simultaneously.

Other designs are known where external shunting circuitry, such as switches or other large circuitry, is connected to the transducing head. Those external circuitry designs have a number of disadvantages, including inefficiencies of space, cost, reliability, and performance.

It is also possible to test the entire transducing head with the shunt in place and without employing guarded measurements. However, known shunts do not have constant and precisely known resistances during fabrication, thereby frustrating attempts to accurately calculate a resistive effect of the sensor element by backing out a resistive effect of the shunt from measurements of the entire transducing head. Stages of fabrication of an HDD often occur in a variety of factory locations, which have varying environmental conditions. Specifically, environmental temperature may vary during fabrication of the HDD. For example, wafers containing numerous transducing heads may be fabricated in a facility different from a facility used to separate wafers into individual transducing heads (i.e. sliders) and a facility used to attach transducing heads to a head gimbal assembly (HGA). Temperature conditions may vary between the various facilities.

Temperature conditions affect a resistance of a shunt having a temperature coefficient of resistance (TCR) not equal to zero. Changes in the resistance of the shunt are typically unpredictable. Thus, attempts to measure a resistance of the sensor element by measuring the resistance of the entire transducing head and adjusting the measurement to exclude the resistance of the shunt are limited by the changing resistivity of the shunt. Proxy measurements of resistances of separate test structures or toolkit shunts not installed in the transducing head introduce errors into measurement, due to such factors as varying resistances of the fuses due to manufacturing tolerances.

Thus, a novel design is needed to provide a transducing head with an ESD shunt that may be repeatedly tested around during fabrication of an HDD and also is permanently removable prior to operation of the transducing head.

BRIEF SUMMARY OF THE INVENTION

A transducing head includes a sensor element having a plurality of terminal pads and a shunt electrically connected with the sensor element in parallel for protecting the sensor element from electrical damage during fabrication of the transducing head. The shunt includes one or more fuses, where the shunt is configured to be repeatedly tested around during fabrication to allow testing of the sensor element. The shunt is structured to be permanently electrically removable prior to operation of the transducing head by directing a shunt removal current through the shunt which effectively creates an open circuit in the shunt without causing a damaging current to flow in the sensor element. In another embodiment, the transducing head includes a shunt electrically connected with the sensor element in parallel. The shunt includes a plurality of removable resistive elements, each resistive element having an element resistance, and an adjustable transducing head resistance defined by the sensor resistance and the element resistances. Sequential removal of some or all of the resistive elements establishes a desired transducing head resistance.

DETAILED DESCRIPTION

Figure 1:
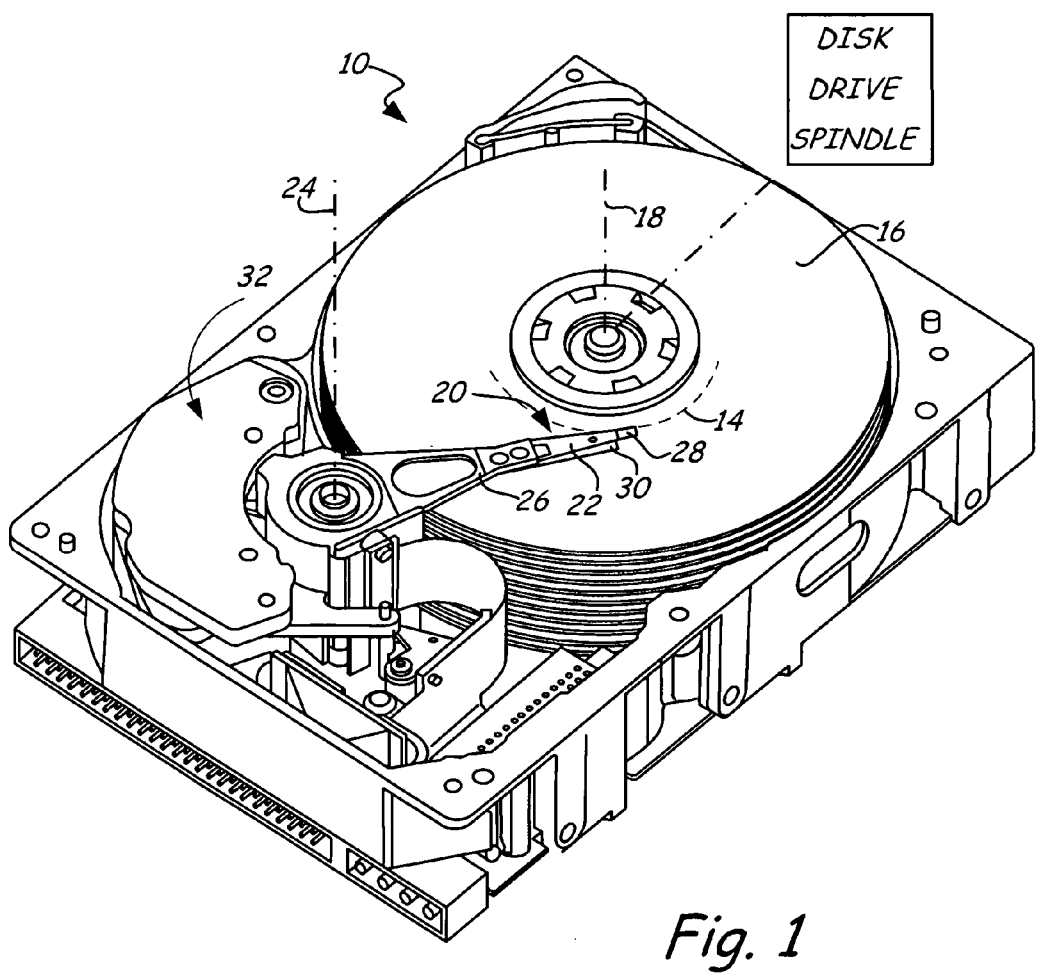
FIG. 1 is a perspective view of a hard disc drive.

FIG. 1 is a perspective view of a hard disc drive (HDD) system 10 for reading and/or writing to magnetic storage medium, such as a disc 16 having a number of concentric data tracks 14. Disc 16 is rotatable about an axis 18 of a spindle. A head gimbal assembly (HGA) 20 is supported by a suspension including an actuator arm 26, which is rotatable about an axis 24. HGA 20 includes a load beam 22, a slider 28, and a flexible interconnect circuit, such as a flex-on-suspension (FOS) 30. A large scale actuation motor, such as voice coil motor (VCM) 32, is used to position actuator arm 26. Movement of actuator arm 26 quasi-radially positions slider 28 above data track 14. Slider 28 "flies" above a surface of disc 16 on a small cushion of air created at an air bearing surface (ABS) of a transducing head, which is attached to slider 28. In operation, the transducing head reads and/or writes to data tracks such as data track 14 where data is stored in the form of localized magnetic fields. Signals from the transducing head are carried by FOS 30 to components located on or behind actuator arm 26, such as a preamp.

The transducing head includes a sensor element for reading data. The sensor element is typically a magnetoresistive (MR) sensor element comprised of a number of layers. Many varieties of sensor elements are known, but all MR sensor elements have relatively small physical sizes, allowing use of the MR sensor element with a magnetic storage medium, such as disc 16, when having a high density of recorded data. The small size of the sensor element renders the sensor element highly sensitive to electrostatic discharge (ESD) and electrical overstress (EOS). ESD specifically refers to an actual discharge, whereas EOS refers to a voltage or current in the sensor element larger than that intended under normal operating conditions, such as during electrical testing; however, as used hereinafter, the terms are intended to contain each other.

ESD and EOS are particularly problematic during fabrication of HDD system 10. Transducing heads are initially fabricated as part of a wafer that contains, for example, about 20,000 transducing heads. Various manufacturing processes are performed on the transducing heads during wafer-level fabrication. Individual transducing heads are then separated from the wafer and mounted on a suspension. The suspension is assembled in a head stack assembly (HSA), which is then assembled in HDD system 10.

It is desired to test a transducing head at various stages of HDD fabrication. Testing allows detection of defective transducing heads prior to assembly in an HDD, thereby reducing waste and expense otherwise generated when additional manufacturing processes are performed on assemblies that include a defective transducing head.

The present invention relates to a transducing head that includes a sensor element having a plurality of terminal pads and a shunt electrically connected with the sensor element in parallel for protecting the sensor element from electrical damage during fabrication of the transducing head. The shunt includes one or more fuses, where the shunt is configured to be repeatedly tested around during fabrication to allow testing of the sensor element. The shunt is structured to be permanently electrically removable prior to operation of the transducing head by directing a shunt removal current through the shunt which effectively creates an open circuit in the shunt without causing a damaging current to flow in the sensor element. Removal of the shunt allows operation of the transducing head without adverse effects due to the presence of the shunt.

In additional embodiments, some or all of the fuses remain in the transducing head. In such embodiments, the transducing head includes a shunt electrically connected with the sensor element in parallel. The shunt includes a plurality of removable resistive elements, each resistive element having an element resistance, and an adjustable transducing head resistance defined by the sensor resistance and the element resistances. Sequential removal of some or all of the resistive elements establishes a desired transducing head resistance.

Figure 2:
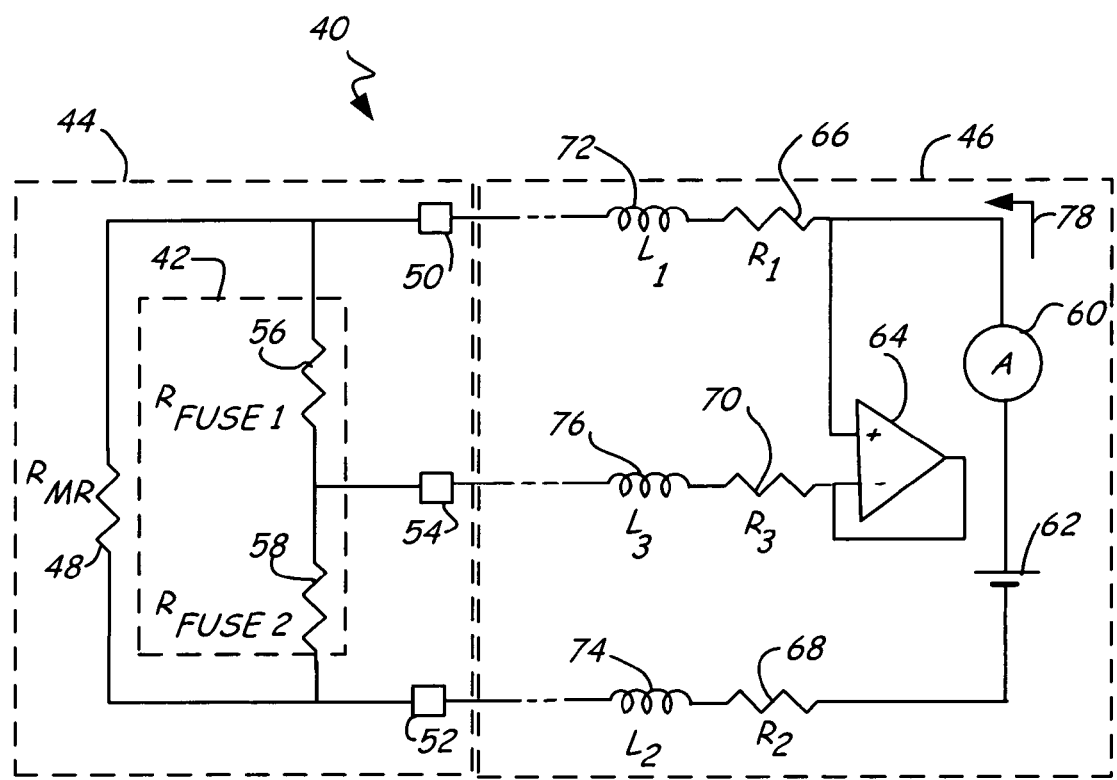
FIG. 2 is a schematic representation of a transducing head circuit having a shunt.

FIG. 2 is a schematic representation of a transducing head circuit 40 having a shunt 42. Transducing head circuit 40 includes a transducing head 44 and a test apparatus 46. Transducing head 44 includes a sensor element 48 such as a magnetoresistive (MR) sensor element having a resistance RMR and first, second and third terminal pads 50, 52 and 54. Shunt 42 includes a first fuse 56 having a resistance $R_{Fuse\ 1}$ and a second fuse 58 having a resistance $R_{Fuse\ 2}$. Shunt 42 is electrically connected to sensor element 48 in parallel. Third terminal pad 54 provides an electrical connection to fuse 42 between first fuse 56 and second fuse 58.

Sensor element 48 is typically a magnetoresistive (MR) sensor element comprised of a number of layers. Sensor element 48 is highly sensitive to electrostatic discharge (ESD) and electrical overstress (EOS) events. ESD specifically refers to an actual discharge, whereas EOS refers to a voltage or current in sensor element 48 larger than that intended under normal operating conditions; however, as used hereinafter, the terms are intended to contain each other.

Many varieties of sensor elements 48 are known, but all MR sensor elements have relatively small physical sizes, allowing use of the MR sensor element with a magnetic storage medium, such as disc 16, when having a high density of recorded data. For example, MR sensor 48, used for high recording densities, will have a cross-section of about 500 angstroms (Å) by about 0.1 micrometers (µm) or smaller, and a resistance of about 50 ohms (Ω) to about 200Ω. Discharges having a voltage of less than a volt through such a physically small MR sensor element 48 are capable of damaging or destroying MR sensor element 48. Damage to sensor element 48 can take a number of forms, including: destruction of MR sensor element 48 by thermal breakdown due to melting, evaporation, or diffusion of layers of sensor element 48; contamination of an air bearing surface of the transducing head; creation of shorts by electrical breakdown and other forms of performance degradation of transducing head 44.

ESD and EOS are particularly problematic during fabrication of the HDD. Transducing heads are initially fabricated as part of a wafer. Individual transducing heads are then separated from the wafer and mounted on a suspension. The suspension is assembled in a head stack assembly (HSA), which is then assembled in the HDD.

Generally, shunt 42 provides a low resistance path in transducing head circuit 40. When shunt 42 is installed and functioning as a shunt, current due to ESD and EOS flows through shunt 42 to avoid damage to the sensor element 48. Shunt 42 then absorbs or dissipates ESD and/or EOS energy.

It is desirable to test transducing head 44 at various stages of HDD fabrication. Testing allows a determination, prior to assembly in an HDD, of whether sensor element 48 is capable of proper operation. Testing identifies defective components, allowing reductions in waste and expense otherwise generated when further manufacturing processes are performed on assemblies that include a defective transducing head. Testing also permits identification of improperly installed components, allowing reworking or other corrective procedures to be performed.

As shown in FIG. 2, test apparatus 46 includes an ammeter 60, a voltage source 62 and operational amplifier (op-amp) 64. Test apparatus 46 is connected to transducing head 44 by a number of leads or traces each having parasitic resistances 66, 68 and 70 ($R_1$, $R_2$, $R_3$), and inductances 72, 74 and 76 ($L_1$, $L_2$, $L_3$). Voltage source 62 generates a test current that flows in a direction indicated by an arrow 78.

Test apparatus 46 electrically connects to transducing head 44 at terminal pads 50–54. Test apparatus 46 allows testing of sensor element 48 during various stages of fabrication of an HDD. A removal apparatus or other apparatus may also electrically connect to transducing head 44 at terminal pads 50–54.

In order to test sensor element 48, shunt 42 must be tested around, meaning shunt 42 is bypassed or removed. Shunt 42 is bypassed by use of op-amp 64. Inputs of op-amp 64 are connected in parallel to first fuse 56. A non-inverting input of op-amp 64 is connected to a positive endpoint of first fuse 56 and a inverting input of op-amp 64 is connected to a negative endpoint of first fuse 56. An output of op-amp 64 is connected to the negative endpoint of the first fuse 56 where the inverting input is also connected. In this configuration, op-amp 64 permits a standard form of guarded measurement of sensor element 48. Op-amp 64 allows voltage across the endpoints of first fuse 56 to be driven toward zero. When op-amp 64 drives voltage across first fuse 56 toward zero in this manner, significant current does not flow through fuse 56. Op-amp 64 thus allows shunt 42 to be temporarily, repeatedly bypassed during fabrication. When shunt 42 is bypassed, a test current will flow through sensor element 48 instead of shunt 42, allowing accurate measurement of a resistance of sensor element 48.

Voltage source 62 and ammeter 60 in FIG. 2 allow a resistance of transducing head circuit 40 to be calculated by applying a given voltage with voltage source 62 and measuring a current with ammeter 60. When the parasitic resistances 66–70 of test apparatus 46 are known, or are sufficiently small as to have no appreciable effect, a resistance of sensor element 48 can be characterized. Magnetic testing is also possible, where an external magnetic field in which sensor element 48 is located is used to test transducing head performance as a function of the external magnetic field.

Determination of the resistance of sensor element 48 allows assessment of whether sensor element 48 is capable of proper operation. If sensor element 48 is found to be damaged or improperly fabricated, transducing head 44 can be repaired, reworked or scrapped to avoid performing further manufacturing processes on a defective or improperly fabricated component.

Test apparatus 46 is removably connected to transducing head 44 at terminal pads 50–54. When op-amp 64 of test apparatus 46 is not functioning to drive the voltage across first fuse 56 to zero, shunt 42 provides a low resistance path in transducing head 44 to reduce current flow through sensor element 48. Some current in the form of a constantly-applied biasing current, may be present in sensor element 48. However, sustained bias current at a relatively small magnitude does not pose a risk of damage to sensor element 48.

Test apparatus 46 is generally configured to physically attach or detach from contact with terminal pads 50–54. Physical removal of test apparatus 46 enhances access to components during HDD fabrication. Generally, test apparatus 46 may be re-connected with terminal pads 50–54 at essentially any point during HDD fabrication to test sensor element 48. In other embodiments, test apparatus 46 may be incorporated into HDD components, such as a preamp that is electrically connected to the transducing head.

Periodic testing of transducing head 44 at various stages of HDD fabrication is desired. Testing allows early detection of defective transducing heads, thereby reducing waste and expense otherwise generated when additional manufacturing processes are performed on assemblies that include a defective transducing head.

Sensor element 48 is vulnerable to ESD and/or EOS damage during fabrication of the HDD whenever a shunt is not formed on transducing head 44. In order to enhance ESD and/or EOS protection to sensor element 48, shunt 42 is preferably deposited on transducing head 44 before or soon after sensor element 48 is formed. Shunt 42 is formed on transducing head 44 during wafer-level manufacturing using well-known deposition techniques. Further manufacturing processes, for example physical or chemical etching, may also be used to form shunt 42.

Shunt 42 is installed by electrically connecting sensor element 48 and shunt 42, preferably immediately after installation of sensor element 48. In addition, shunt 42 preferably remains installed in transducing head 44 after wafer-level manufacturing.

Transducing head 44 remains vulnerable to ESD and/or EOS damage during fabrication, including head gimbal assembly (HGA) processes. Shunt 42 may be removed at essentially any time during fabrication, but preferably shunt 42 is removed after HGA assembly and before HSA assembly. Because shunt 42 provides a relatively low resistance electrical path in transducing head 44, shunt 42 poses an obstacle to operation of the HDD by undesirably diverting current intended to flow through sensor element 48. As such, shunt 42 is permanently removed from transducing head 44 prior to operation of the HDD.

Figure 3:
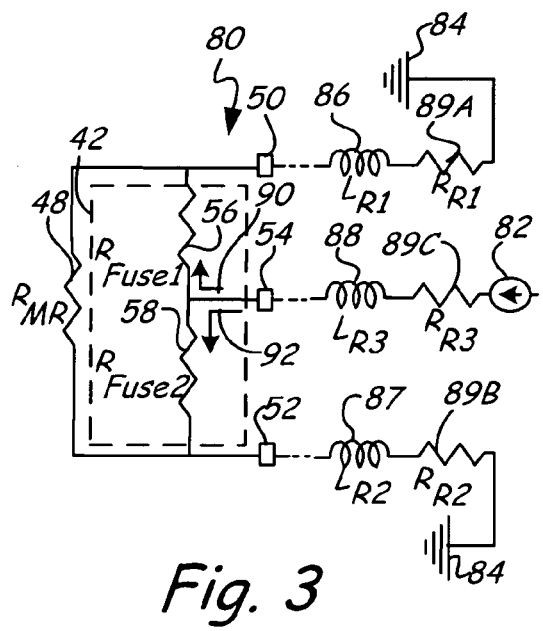
FIG. 3 is a schematic representation of a transducing head having a shunt with a shunt removal current applied.
Figure 4:
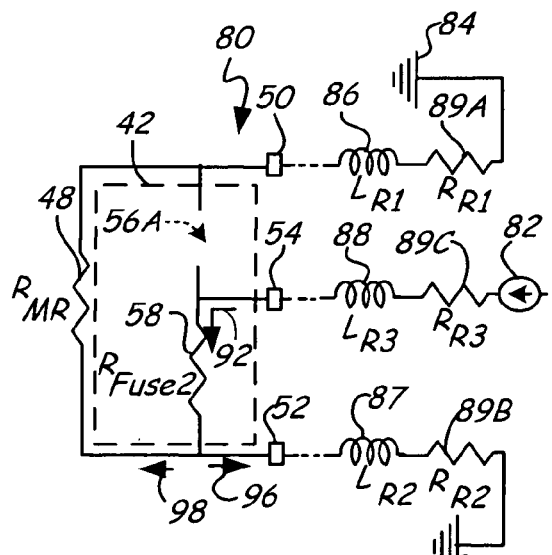
FIG. 4 is a schematic representation of a transducing head having a shunt partially removed by a shunt removal current.

FIGS. 3 and 4 are schematic representations of a transducing head circuit 80. FIG. 3 is a schematic representation of transducing head circuit 80 having a shunt with a shunt removal current 82 applied. FIG. 4 is a schematic representation of a transducing head circuit 80 having shunt 42 partially removed by shunt removal current 82. Referring now to FIG. 3, fuses 56 and 58 are structured to be permanently electrically removable prior to operation of transducing head circuit 80 by applying shunt removal current 82. During removal of shunt 42, shunt removal current 82 is applied to third terminal pad 54 and first and second terminal pads 50 and 52 are connected to a ground 84. Parasitic inductances 86, 87 and 88 ($L_{R1}$, $L_{R2}$, $L_{R3}$) and parasitic resistances 89A, 89B and 89C ($R_{R1}$, $R_{R2}$, $R_{R3}$) are present between a source of shunt removal current 82 and ground 84. Shunt removal current 82 flows through first fuse 56 and second fuse 58. About half of shunt removal current 82 flows through first fuse 56, in a direction indicated by an arrow 90, and generally toward ground 84 through first terminal pad 50. A remainder of shunt removal current 82 flows through the second fuse 58, in a direction indicated by an arrow 92, and generally toward ground 84 through second terminal pad 52.

Application of shunt removal current 82 permanently removes fuses 56 and 58. Removal is synonymously referred to as breakdown or burnout. Because fuses 56 and 58 cannot be made identical, burnout of fuses 56 and 58 is non-simultaneous. Moreover, parasitic resistances in transducing head circuit 80, such as parasitic resistance 89A, 89B and 89C, influence non-simultaneous fuse burnout. FIG. 4 is a schematic representation of transducing head circuit 80 having shunt 42 partially removed by shunt removal current 82. As shown in FIG. 4, an empty location 56A creates an open circuit where fuse 56 once was. Shunt removal current 82 travels in a direction indicated by an arrow 92 through second fuse 58. Those skilled in the art will recognize that it is possible for second fuse 58 to breakdown prior to first fuse 56. In this embodiment, the particular order of fuse breakdown is not important, nor is a direction of shunt removal current 82 or relative positions of grounds 84 and a power supply (not shown).

After partial shunt removal, as seen in FIG. 4, current is diverted in transducing head circuit 80 such that a portion of shunt removal current 82 flows through sensor element 48 in a direction indicated by an arrow 98, and a remaining portion of shunt removal current 82 flows from second fuse 58 to second terminal pad 52 to ground 84.

Figure 5:
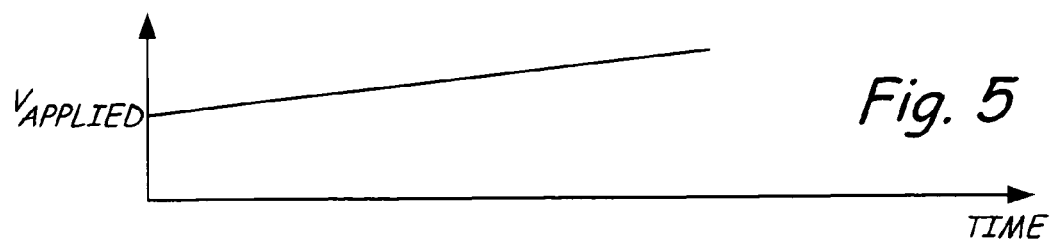
FIG. 5 is a graph representing voltage applied to a transducing head as a function of time during shunt removal.

FIGS. 5–8 are graphs representing electrical characteristics of transducing head circuit 80, as shown in FIGS. 3 and 4, as a function of time during shunt removal. FIG. 5 is a graph representing voltage ($V_{Applied}$) created by shunt removal current 82 applied to transducing head circuit 80 over time, measured across from third terminal pad 54 to ground 84. Voltage is ramped-up over time, meaning voltage applied increases over time during shunt removal. Due to manufacturing tolerances, precise breakdown characteristics of fuses 56 and 58 may not be known. Voltage applied is thus ramped-up to ensure that particular breakdown voltages of fuses 56 and 58 are achieved. In another embodiment, voltage applied to shunt 42 is substantially constant over time.

Figure 6:
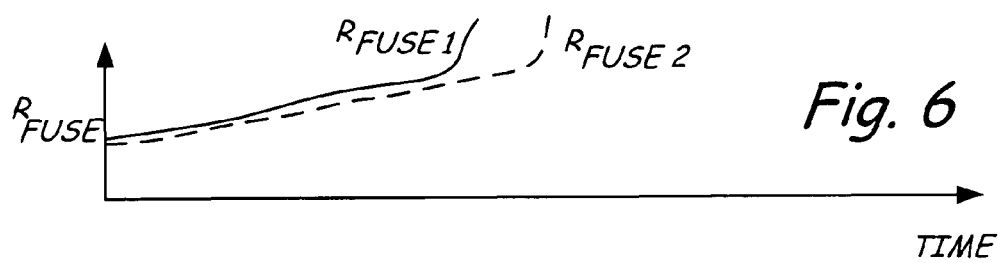
FIG. 6 is a graph representing resistance of a pair of fuses as a function of time during shunt removal.

FIG. 6 is a graph representing a resistance of first fuse 56 ($R_{Fuse\ 1}$) and a resistance of second fuse 58 ($R_{Fuse\ 2}$) as a function of time during shunt removal. Generally, as shunt removal current 82 is applied to fuses 56 and 58, temperature of fuses 56 and 58 will rise.

As the temperature of fuses 56 and 58 rises, a process known as thermal runaway often occurs. Thermal runaway generally behaves as a positive feedback loop. As fuses 56 and 58 absorb power, temperatures and resistances of fuses 56 and 58 rise as shunt removal current 82 is applied. At higher resistances, when the shunt removal current is substantially constant, more power is absorbed by fuses 56 and 58, generating greater temperature rises in fuses 56 and 58. This cyclical thermal runaway process ends with breakdown of fuses 56 and 58 in short, catastrophic events. Such short, catastrophic events are likely to cause a damaging current to flow in sensor element 48.

Each fuse 56 and 58 has a relatively low resistance, such as 10Ω, when first installed in transducing head 44. Permanent electrical removal of a fuse effectively causes an open circuit in the fuse. After breakdown, fuses 56 and 58 have resistances greater than about one kilo ohm (KΩ). Sensor element 48 has a resistance of about 50Ω to about 200Ω.

Thus, fuses 56 and 58, and therefore shunt 42, begins with a significantly lower resistance than sensor element 48, but upon electrical removal shunt 42 has a substantially higher resistance than sensor element 48. When resistances of fuses 56 and 58 approach values greater than about one kilo ohm, fuses 56 and 58 no longer pass current at reasonable voltages, and an open circuit is effectively created in fuses 56 and 58. Complete removal of shunt 42 occurs when both fuses 56 and 58 are removed.

Figure 7:
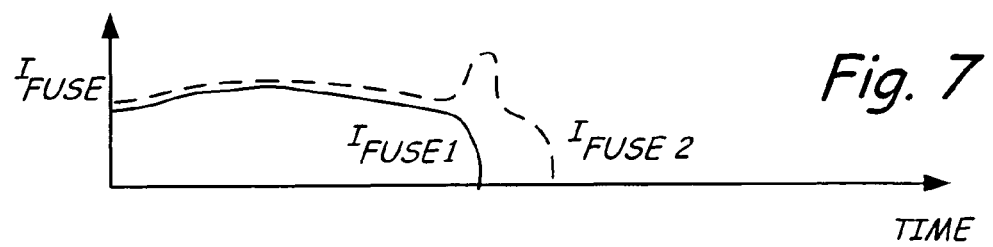
FIG. 7 is a graph representing current in the pair of fuses as a function of time during shunt removal.

FIG. 7 is a graph representing current in first fuse 56 ($I_{Fuse\ 1}$) and second fuse 58 ($I_{Fuse\ 1}$) as a function of time during shunt removal. Current in first fuse 56 and second fuse 58 changes over time as shunt removal current 82 is applied to shunt 42. As thermal runaway occurs immediately prior to complete breakdown of fuses 56 and 58, current in fuses 56 and 58 decreases over a relatively short period of time. The decrease in current in fuses 56 and 58 corresponds to the increase in resistance of fuses 56 and 58 immediately prior to complete breakdown of fuses 56 and 58.

Shunt removal current 82 is applied to shunt 42 for a period of time until shunt 42 is permanently electrically removed. Fuses 56 and 58 change resistance during a characteristic time period, called a breakdown time. Permanent electrical removal of fuses 56 and 58 is a dynamic breakdown process, which, here, is characterized as an increase in a resistance of a fuse (fuse 56 or fuse 58, for example) by a factor of about ten. However, an ultimate increase in resistance of the fuse may be greater than that portion of the ultimate increase in resistance that characterizes permanent electrical removal, such as when resistance of a fuse ultimately increases by a factor of about one hundred. The particular increase in resistance of the fuse will be influenced by the particular electrical characteristics of components of transducing head 44.

Breakdown time of fuses 56 and 58 is selected such that a damaging current is not created in sensor element 48. If fuses 56 and 58 open with a sufficiently short breakdown time, shunt removal will likely generate a pulse that is capable of damaging sensor element 48. When the breakdown time is short, a sudden change in a resistance of fuse 56, for example, creates a current surge (i.e., a short, fatal pulse, largely attributable to parasitic inductances in transducing head circuit 80) through sensor element 48. For example, if the current surge is greater than about 10 milliamps for as long as one nanosecond, the current surge will likely damage sensor element 48. However, when a breakdown time is sufficiently long, for example when the breakdown time is greater than about 10 nanoseconds, a current surge through sensor element 48 becomes negligible, meaning a damaging current is not created in sensor element 48. For fuse breakdown times between about 0.1 and about 10 nanosecond, increasingly long breakdown times lead to substantially smaller current surges through sensor element 48. A size of the current surge through sensor 48 will vary will vary according to particular electrical characteristics of transducing head circuit 80, including the breakdown time, relevant transducing head circuit impedances, and overall applied voltages and currents. Furthermore, various transducing head designs may lead to thresholds for electrical failure that have widely varying current levels associated with them. As such, the breakdown time is preferably greater than about 10 nanosecond; however, it is possible that the breakdown time may be less than 10 nanoseconds (e.g. about 1 nanosecond) without generating a damaging current in sensor element 48 during shunt removal.

Figure 8:
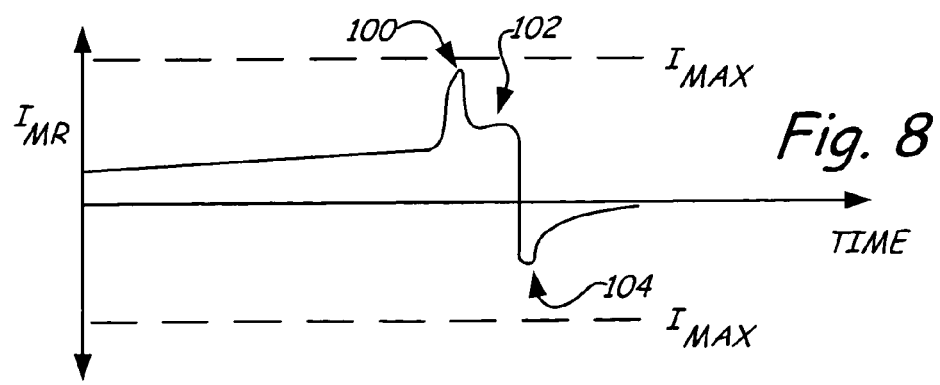
FIG. 8 is a graph representing current in a sensor as a function of time during shunt removal.

FIG. 8 is a graph representing current in sensor element 48 ($I_{MR}$) as a function of time during shunt removal. Initially, a small current is present in sensor element 48 due to imperfectly balanced resistances between first fuse 56 and second fuse 58, or due to a biasing current used to bias sensor element 48. A first peak 100 corresponds to an increase in current through sensor element 48 as first fuse 56 is removed. Peak 100 represents a pulse due to a finite impedance, such as inductor 86, of leads and traces of transducing head circuit 80 and a removal apparatus. Long leads or traces may be present between first terminal pad 50 and ground 84, which creates a significant inductance in transducing head circuit 80.

As first fuse 56 is opened, a transient current is created, which travels through transducing head circuit 80 through sensor element 48. Fuses 56 and 58 are structured such that a damaging current is not created in sensor element 48. Peak 100 does not exceed a level sufficient to damage sensor element 48, such level indicated in FIG. 8 as $I_{max}$. As detailed further below, shunt 42 is structured in various ways to avoid creating a damaging current in sensor element 48 by affecting shunt breakdown time, generally to avoid instantaneous breakdown of fuses 56 and 58. Various embodiments detailed below describe shunts where: fuse material properties affect fuse breakdown time (first through fifth embodiments); a heat sink included in shunt 42 affects fuse breakdown time (sixth embodiment); fuse geometry affects fuse breakdown time (seventh embodiment); and fuses are configured in a parallel array to affect shunt breakdown time (eighth and ninth embodiments).

Peak 102, shown in FIG. 8, represents a longer pulse owing to parasitic resistances present in transducing head circuit 80. Peak 102 corresponds to current in sensor element 48 after partial shunt removal, such as when one fuse has been removed as shown in FIG. 4. A current divider is created after first fuse 56 is removed. Shunt removal current 82 flows in direction 92 through second fuse 58. Then a portion of shunt removal current 82 flows in direction 96 through second terminal pad 52 to ground 84, and a remainder of shunt removal current 82 flows in direction 98 through sensor element 48 and first terminal pad 50 to ground 84.

The resistances of the leads are substantially equal, such that $R_{R1}=R_{R2}=R_{R3}=R_{Lead}$. The resistances of the fuses substantially equal, such that $R_{Fuse\ 1}=R_{Fuse\ 2}=R_{Fuse}$. After partial shunt removal, only first fuse 56, of resistance $R_{Fuse}$, remains. Current in sensor element 48 ($I_{MR}$) generated at peak 102 during shunt removal is described as:

$$I_{MR} = \frac{V_{Applied} \cdot R_{Lead}}{(R_{Lead} + R_{Fuse}) \cdot (2R_{Lead} + R_{MR}) + R_{Lead} \cdot (R_{Lead} + R_{MR})}$$

For typical values of fuse and lead resistances, current in sensor element 48 ($I_{MR}$) is roughly proportional to the resistance of the leads ($R_{Lead}$).

Peak 104 represents a pulse in transducing head circuit 80 during removal of second fuse 58. As with first fuse 56, a sudden change in an impedance of second fuse 58 typically leads to an inductive current surge through sensor element 48. As detailed below, shunt 42 of the present invention is structured such that a damaging current is not created in sensor element 48.

The pulse represented by peak 104 is influenced by resistance of fuses 56 and 58, breakdown voltage of fuses 56 and 58, resistance of leads and traces between transducing head 80 and a test or removal apparatus, inductance of leads and traces between transducing head 80 and the test or removal apparatus, temperature coefficients of resistance (TCR) of fuses 56 and 58, and breakdown time of fuses 56 and 58.

Quasi-static current flowing in transducing head 80 after partial shunt removal, when exactly one fuse has been removed but another has not been removed, is influenced by resistance of fuses 56 and 58, breakdown voltage of the fuse, resistance of leads and traces between transducing head 80 and the test or removal apparatus, resistance of sensor element 48, and TCR of fuses 56 and 58.

Shunt 42 is structured such that current in sensor element 48 does not exceed a safe level, in other words, current through sensor element 48 is less than current sufficient to breakdown sensor element 48.

In order to limit an AC impedance pulse, shown as peak 100 in FIG. 8, a breakdown time for fuses 56 and 58 is selected such that inductors in transducing head circuit 80 (e.g. inductors 86 and 88) play negligible roles. This means when the breakdown time is sufficiently long, transducing head circuit 40 behaves as if inductors 86 and 88 are short circuits.

In a fuse having an applied voltage (V) and a resistance (R), power in the fuse (W) is generally described as: $W=(V^2/R)$. Increased power in a fuse generates increased heat, which causes thermal runaway. As resistance (R) slowly increases over time, power (defined as $(V^2/R)$) decreases slowly over time. As a shunt removal current is applied to fuses 56 and 58 over time, resistances of fuses 56 and 58 ($R_{Fuse\ 1}$ and $R_{Fuse\ 2}$) increase over time. Power absorbed by fuses 56 and 58 decreases to avoid thermal runaway, and prevents fuses 56 and 58 from breaking down instantaneously. This creates a negative feedback loop, in contrast to a positive feedback loop resulting from thermal runaway. With a negative feedback loop, less heat is generated by breakdown of fuses 56 and 58, and breakdown of fuses 56 and 58 eventually stops until voltage of the shunt removal current is increased.

In a first embodiment, fuses 56 and 58 are formed of a material having a sufficiently long breakdown time. Any suitable resistive material may be used. Suitable resistive material is chosen to optimize the breakdown time for fuses 56 and 58 so that a damaging current is not created in sensor element 48 during shunt removal. Material for fuses 56 and 58 is selected such that fuses 56 and 58 do not breakdown instantaneously due to thermal runaway. For example, material is selected with breakdown time greater than about 10 nanoseconds.

Figure 9:
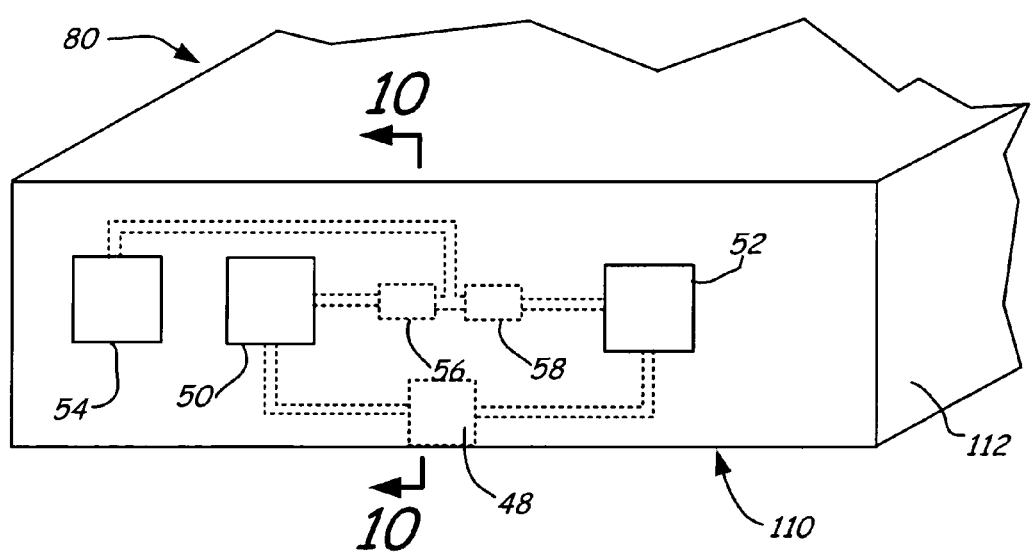
FIG. 9 is perspective view of a transducing head illustrating a number of terminal pads and a shunt.
Figure 10:
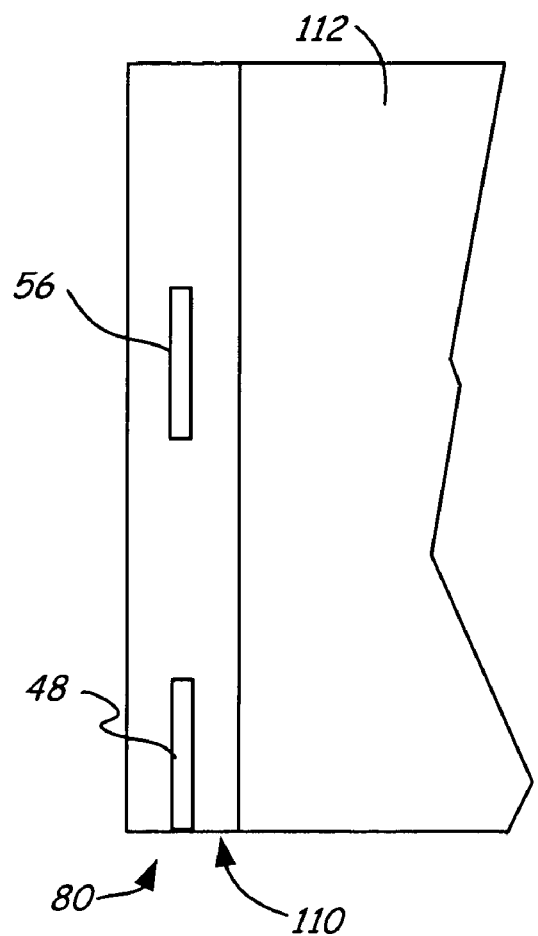
FIG. 10 is a simplified cross-sectional view of the transducing head taken along line 10—10 of FIG. 9.

FIG. 9 shows transducing head 80, and illustrates a number terminal pads 50–54, and fuses 56 and 58. Transducing head 80 has sensor element 48 positioned relative an air bearing surface (ABS) 110. First fuse 56 and second fuse 58 are connected to sensor element 48 in parallel. Third terminal pad 54 is electrically connected between fuses 56 and 58. Transducing head 80 is shown, for illustrative purposes only, supported on a slider body or substrate 112. FIG. 10 is a simplified cross-sectional view of transducing head 80 taken along line 10—10 of FIG. 9.

Figure 11:
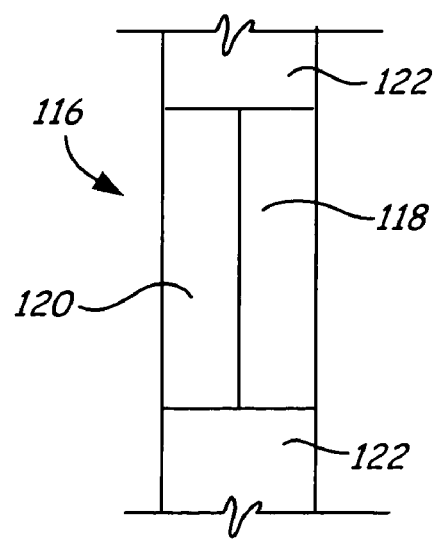
FIG. 11 is top view of a multi-layer fuse.

In a second embodiment, a fuse is formed of multi-layer material. FIG. 11 shows a multi-layer fuse 116. Fuse 116 includes a first resistive material 118 having a resistance $R_1$ and a second resistive material 120 having a resistance $R_2$. First and second resistive materials 118 and 120 are arranged in parallel and connected to leads 122. Breakdown of fuse 116 forms an alloy of first and second resistive materials 118 and 120, the alloy having a resistance $R_A$, where $R_1\|R_2<R_A$. Thus, the alloy effect of multi-layer fuse 116 allows the breakdown time to be sufficiently long, for example, the breakdown time being greater than about 10 nanoseconds. Those skilled in the art will recognize that first and second resistive materials 118 and 120 may be selected from suitable resistive materials to achieve a desired breakdown time. Multi-layer fuse 116 could, for example, be formed of materials used to form bottom spin valves (BSVs).

In a third embodiment, a breakdown time of multi-layer fuse 116 is sufficiently long due to diffusion of first resistive material 118 and second resistive material 120. In this embodiment, breakdown of fuse 116 causes diffusion of first and second resistive materials 118 and 120. Fuse 116 has a post-diffusion resistance $R_D$, where $R_1\|R_2<R_D$. Particular material is chosen to optimize breakdown time for fuses 116 so that a damaging current is not created in sensor element 48 during shunt removal.

In a fourth embodiment of the present invention, fuses 56 and 58 are formed of material that sublimes in response to shunt removal current 82. Breakdown of fuses 56 and 58 due to sublimation is generally a slow process, such that a breakdown time of fuses 56 and 58 is long. Such sublimable material is, for example, Cr.

Figure 12:
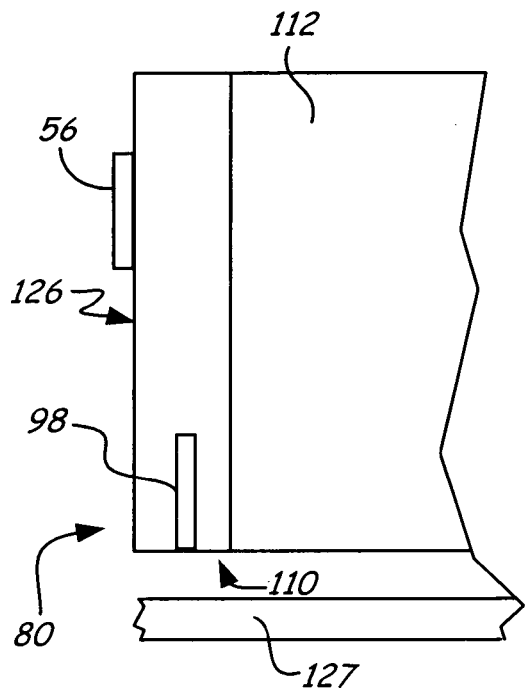
FIG. 12 is a simplified cross-sectional view of a transducing head having a shunt including a sublimable fuse.

FIGS. 12–15 show simplified cross-sectional views of possible locations of sublimable fuses on transducing head 80. FIG. 12 shows fuse 56 located in a first position opposite substrate 112 along a face 126. Debris on ABS 110, in the form of built up particle contamination, can cause unstable slider flight. Contamination of ABS 110 can also reduce or destroy the functioning of transducing head 80. Contaminants on ABS 110 can act as an abrasive that scratches a magnetic layer of a storage medium 127, thereby destroying the capacity for storage medium 127 to retain data. Additionally, contamination on storage medium 127 can hinder writing and/or reading to and from storage medium 127 or cause buildup that acts as an abrasive that damages transducing head 80. Such contamination leads to errors when operating an HDD. By placing fuse 56 in the first position shown in FIG. 12, a risk of contamination of ABS 110 and storage medium 127 is reduced.

Figure 13:
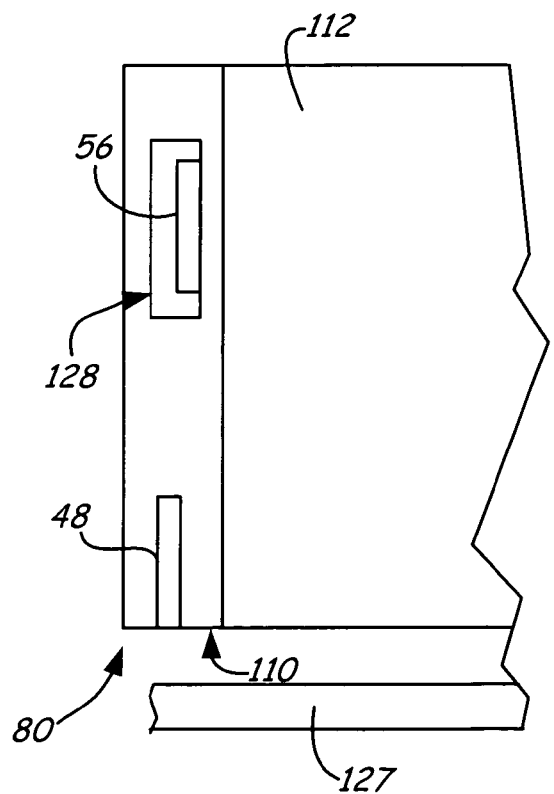
FIG. 13 is a simplified cross-sectional view of another embodiment of a transducing head having a shunt including a sublimable fuse.

FIG. 13 shows fuse 56 located in a second position disposed substantially inside a cavity 128 for capturing fuse material as fuses 56 and 58 sublime. Both fuses 56 and 58 are disposed within cavity 128. In further embodiments, fuses 56 and 58 may be located in separate cavities. Cavity 128 is a vacuum. In further embodiments, cavity 128 includes air or a low bulk modulus material such as photoresist material. Fuse material is retained in cavity 128 as fuse 56 sublimes, thereby preventing particles generated by breakdown of fuse 56 from migrating to ABS 110 of transducing head 80 or to magnetic storage medium 127. Retaining particles in cavity 128 thereby limits contamination that leads to errors in the operation of the HDD.

Figure 14:
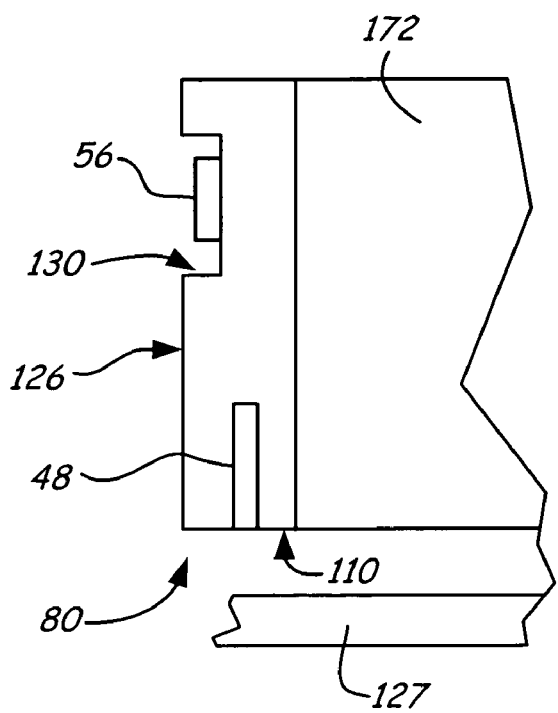
FIG. 14 is a simplified cross-sectional view of another embodiment of a transducing head having a shunt including a sublimable fuse.

FIG. 14 shows fuse 56 located in a third position disposed substantially inside cavity 130, where cavity 130 is located along face 126. Cavity 130 is partially open to allow air to enter and exit cavity 130. Cavity 130 is positioned away from ABS 110, reducing a risk of generating particles that contaminate ABS 110 or storage medium 127.

Figure 15:
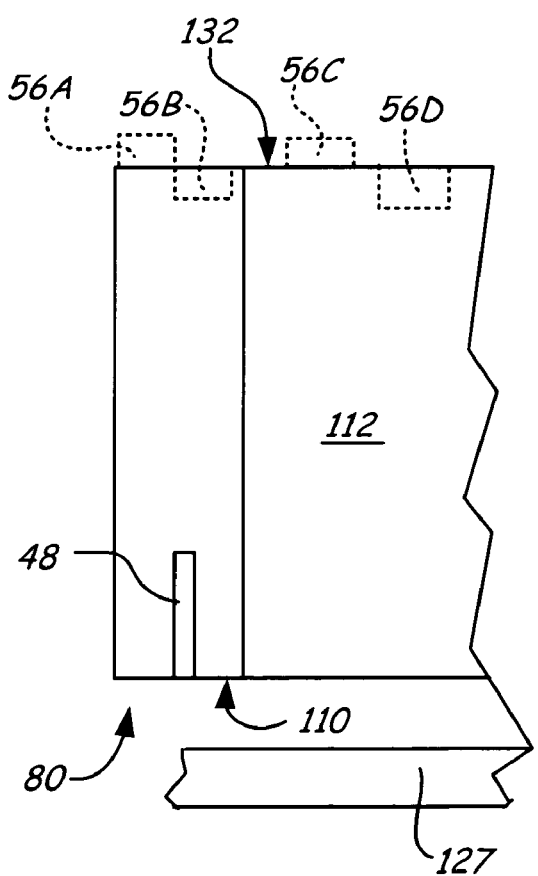
FIG. 15 is a simplified cross-sectional view of another embodiment of a transducing head having a shunt including a sublimable fuse, showing possible locations for such a fuse.

FIG. 15 shows the fuse located in fourth, fifth, sixth, and seventh positions 56A, 56B, 56C or 56D disposed along face 132 opposite ABS 110. Positions 56A and 56B show the fuse located on transducing head 80. Positions 56C and 56D show the fuse located on substrate 112. FIGS. 12–15 are for illustrative purposes, and those skilled in the art will recognize that other locations for sublimable fuses 56 and 58 are possible without departing from the spirit or scope of the present invention. In the fourth through seventh positions, fuse 56 is located opposite ABS 110 to reduce the risk of generating particles that contaminate ABS 110 or storage medium 127.

In a fifth embodiment of the present invention, each fuse 56 and 58 has a high temperature coefficient of resistance (TCR), such that heat generated by shunt removal current 82 increases a resistance of fuses 56 and 58 over a sufficiently long period of time prior to catastrophic breakdown of the fuse, for example, a breakdown time being greater than about 10 nanoseconds. Owing to a TCR of fuses 56 and 58, resistances of fuses 56 and 58 generally increase as the temperature of fuses 56 and 58 rises. Resistance of a fuse at temperature one ($R_1$) is equal to a reference resistance ($R_0$) plus the TCR (a) times $R_0$ times the change in temperature from a reference temperature ($T_0$) to a current temperature ($T_1$), described as:

$$R_1 = R_0 + a \cdot R_0 \cdot (T_1 - T_0)$$

Depending on what material is used to form fuses 56 and 58, the TCR (a) will vary. A high TCR indicates a fuse exhibits a relatively large change in resistance for a given temperature change. Fuses 56 and 58 having a high TCR are formed of material such as, for example, Ni, which has a TCR (a) value of 6,000 ppm/deg. C.

The resistances of first and second fuses 56 and 58 increase as shunt removal current 82 is applied to shunt 42 over time, as shown in FIG. 6. As a temperature of fuses 56 and 58 rises or falls prior to catastrophic breakdown (when an effectively open circuit is created in fuses 56 and 58), the resistance of fuses 56 and 58 is able to increase or decrease without irreversible effects. Catastrophic breakdown of fuses 56 and 58 is irreversible.

The high TCR of fuses 56 and 58 decreases current in transducing head circuit 80 during shunt removal and immediately prior to catastrophic breakdown of fuses 56 and 58 by lessening an amount of resistance change when fuses 56 and 58 finally open catastrophically. The changes in resistances of fuses 56 and 58 during catastrophic breakdown of fuses 56 and 58 represent a relatively small proportion of the overall changes in resistances of fuses 56 and 58 during shunt removal overall. Thus, by reducing current in transducing head circuit 80 immediately prior to catastrophic breakdown of fuses 56 and 58 having high TCR values, a damaging current is not creating in sensor element 48 during shunt removal.

Figure 16:
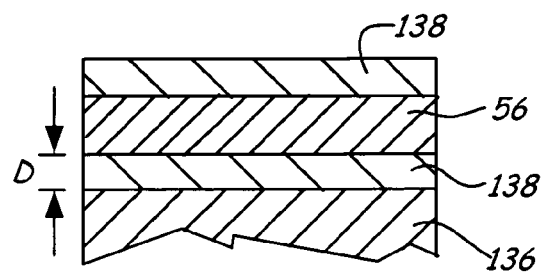
FIG. 16 is a partial cross-sectional view of a fuse illustrating a heat sink.

A sixth embodiment of the present invention is shown in FIG. 16, a partial cross-sectional view of fuse 56 and a heat sink 136. Heat sink 136 is positioned adjacent to fuse 56 and is electrically insulated from fuse 56. An electrical insulator 138 is disposed between heat sink 136 and fuse 56. Heat sink 136 is spaced from fuse 56 a distance D. For illustrative purposes only, insulator 138 is located on both sides of fuse heat sink 136. In a further embodiment, additional heat sinks are located adjacent to fuse 56.

As described above with respect to FIGS. 3 and 4, as shunt removal current 82 is applied to fuse 56, the temperature of fuse 56 increases. Heat sink 136, shown in FIG. 16, absorbs thermal energy from fuse 56 to slow a temperature increase and thereby slow the breakdown time of fuse 56 and to avoid thermal runaway. Heat sink 136 is electrically insulated from fuse 56 by insulator 138 in order to avoid diverting current 82 to heat sink 136.

In a seventh embodiment of the present invention, fuses 56 and 58 are rectangular thin film resistors each having a resistance, a breakdown voltage, a breakdown time, a length and a width, where the length and the width are configured such that the breakdown time for the given resistance and the breakdown voltage of the fuse is sufficiently long. The breakdown time of rectangular fuses varies as a shape or geometry of the resistor changes, when resistance and breakdown voltage are held constant. Thus, the breakdown time for fuses 56 and 58 can be optimized to obtain a sufficiently long breakdown time such that a damaging current is not created in sensor element 48 when a shunt removal current is applied to fuses 56 and 58.

Figure 17:
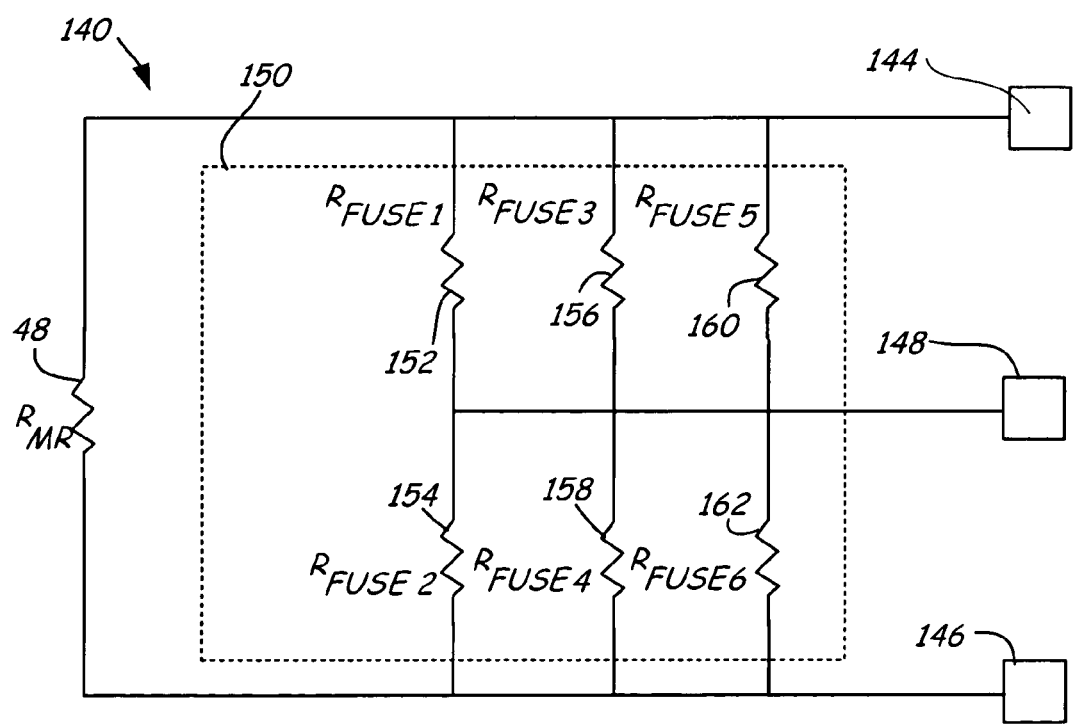
FIG. 17 is a schematic representation of another embodiment of a transducing head circuit having a shunt.

FIG. 17 is a schematic representation of an eighth embodiment of a transducing head 140, which includes a sensor element 48 having a resistance RMR, first, second, and third terminal pads 144, 146 and 148, and a shunt 150. Shunt 150 is configured as a parallel array.

First terminal pad 144 and second terminal pad 146 are electrically connected to sensor element 48. Shunt 150 is electrically connected across sensor element 140 in parallel. Third terminal pad 148 is electrically connected directly to shunt 150. Shunt 150 includes the parallel array of first through sixth fuses 152–162 having resistances $R_{Fuse\ 1}$ to $R_{Fuse\ 6}$. In further embodiments, any number of fuses can be used in the parallel array of fuses that define shunt 150.

Figure 18:
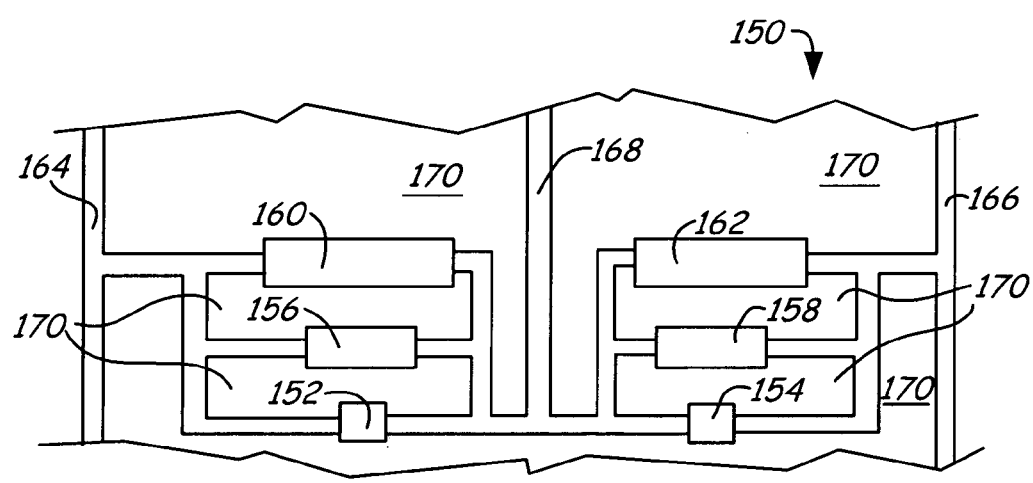
FIG. 18 is a top view of a parallel array of fuses.

FIG. 18 is a top view of shunt 150. Fuses 152–162 are electrically connected by a number of leads 164, 166 and 168. Insulators 170 are provided surrounding fuses 152-162 and leads 164–168. As shown in FIG. 18, fuses 152 and 154 have substantially the same resistance ($R_\alpha$), fuses 156 and 158 have substantially the same resistance ($R_\beta$), and fuses 160 and 162 have substantially the same resistance ($R_\gamma$). In further embodiments, other electrically equivalent configurations of shunt 150 are possible. In further embodiments, any number of fuses can be used in the parallel array of fuses that define shunt 150; however, generally an even number of fuses define shunt 150.

As described and shown with respect to previous embodiments above, terminal pads 144–148 accept electrical signals from a test and removal apparatus for testing a resistivity of sensor element 48. As described above, an op-amp connected to third terminal pad 148 allows shunt 150 to be bypassed for testing during the fabrication of transducing head 140. Additionally, shunt 150 is permanently electrically removable by directing a shunt removal current through third terminal pad 148 while grounding first and second terminal pads 144 and 146.

During removal of shunt 150, fuses 152–162 are removed sequentially. Generally, first fuse 152 is removed followed by second fuse 154 followed by third fuse 156 followed by fourth fuse 158 followed by fifth fuse 160 followed by sixth fuse 162. In further embodiments, fuses 152–162 may be removed in a different order; however, the fuses are generally removed in a sequence that avoids significant imbalances in resistance of shunt 150.

Figure 20:
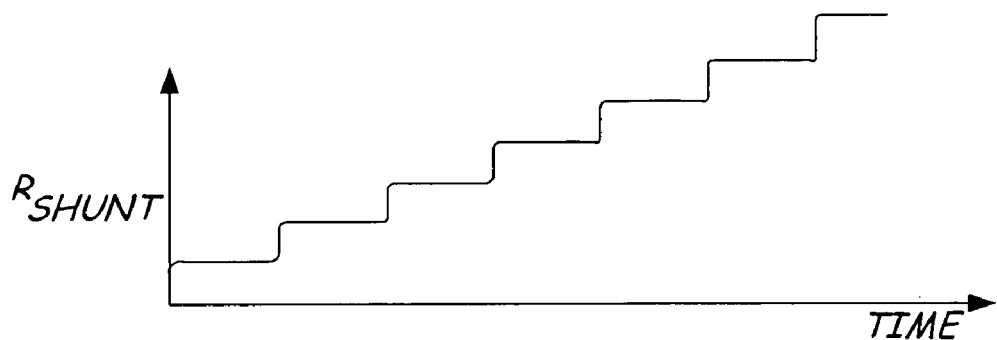
FIG. 20 is a graph representing resistance of a shunt as a function of time during shunt removal.
Figure 19:
FIG. 19 is a graph representing voltage applied to another embodiment of a transducing head as a function of time during shunt removal.
Figure 21:
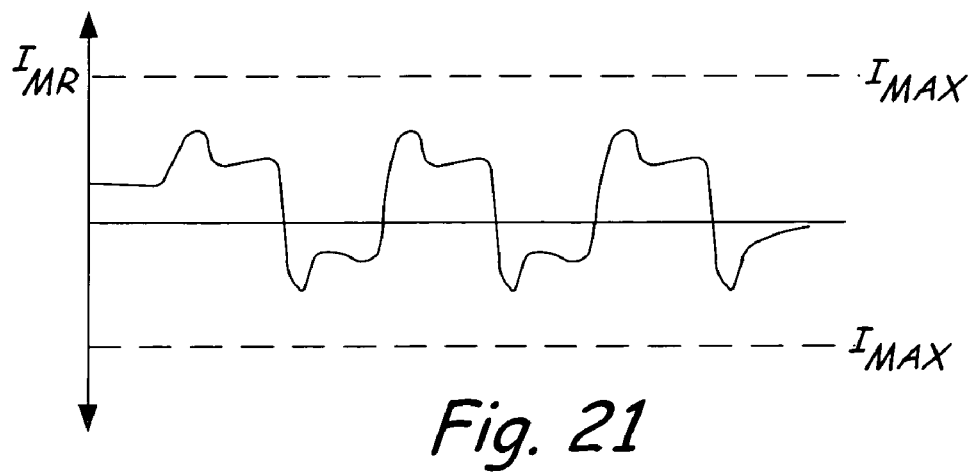
FIG. 21 is a graph representing current in a sensor as a function of time during shunt removal.

FIGS. 19–21 are graphs representing electrical characteristics of transducing head 140 as a function of time during shunt removal. FIG. 19 shows voltage applied ($V_{Applied}$) across the shunt 140 over time. Such voltage is ramped-up to sequentially remove fuses (e.g., from those having generally lower breakdown voltages to those having generally higher breakdown voltages). Fuses having substantially different resistances also have substantially different breakdown voltage characteristics.

FIG. 20 is a graph representing an overall resistance of shunt 150 ($R_{Shunt}$) as a function of time during shunt removal. First and second fuses 152 and 154 having resistance $R_\alpha$ are structured to burn out first. First and second fuses 152 and 154 have lower resistances than fuses 156-162 (having resistances $R_\beta$ and $R_\gamma$, respectively). Current generally flows through the lowest resistance path. As fuses are sequentially removed from shunt 150, the overall resistance of shunt 150 increases as some paths, such as through fuses 152 and 154, are removed leaving fewer overall current paths, such as through fuses 156–162.

FIG. 21 is a graph representing current ($I_{MR}$) in sensor element 48 as a function of time during shunt removal. Current through sensor element 48 does not exceed $I_{max}$ such that a damaging current is not created in sensor element 48. As all fuses 152–162 are removed, current through sensor element 48 approaches zero or some non-zero value corresponding to a biasing current applied to sensor element 48. Rather than producing a single, large pulse (i.e. a damaging current) in sensor element 48 during shunt removal, removal of parallel array shunt 140 involves a number of small currents, well-separated in time, through sensor element 48. Such small, time-separated currents through sensor element 48 during parallel array shunt removal exhibit a reduced risk of damage to sensor element 48.

In a ninth embodiment of the present embodiment, sequential removal of some or all of an array of fuses establishes a desired transducing head resistance. As shown in FIGS. 17 and 18, transducing head 140 with ESD and/or EOS protection includes sensor element 48 having sensor resistance ($R_{MR}$), and shunt 150 electrically connected with sensor element 48 in parallel, shunt 150 including a plurality of removable fuses or resistive elements 152–162, each resistive element 152–162 having an element resistance ($R_{Fuse1}$ to $R_{Fuse6}$), and an adjustable transducing head resistance ($R_{Head}$) defined by the sensor resistance and the element resistances, wherein sequential removal of some or all of resistive elements 152–162 establishes the desired transducing head resistance.

Resistive elements 152–162 may be removed in a number of ways. First, resistive elements 152–162 may be removed using known mechanical removal processes such as laser trimming. When laser trimming is used, resistive elements are generally located on an outer surface of transducing head 140, similar to that illustrated with respect to a location of fuse 56 on transducing head 80 in FIGS. 12 and 15. A laser is then used to create an effectively open circuit in some or all of resistive elements 152–162, by cutting away portions of resistive elements 152–162 or causing thermal breakdown of resistive elements 152-162. Second, resistive elements 152–162 may be permanently electrically removed in the manner shown in FIGS. 19–21 and described with respect to the previous embodiment.

Figure 22:
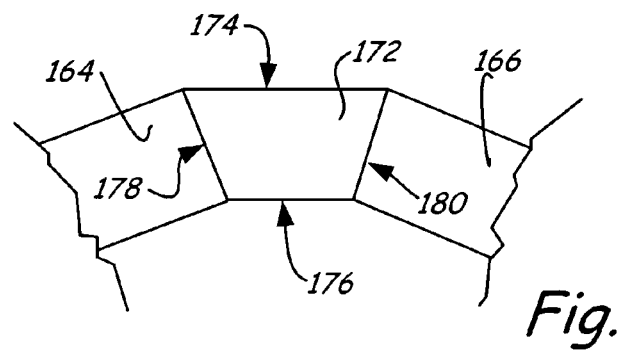
FIG. 22 is a top view of another embodiment of a fuse.

FIG. 22 is a top view of a tenth embodiment of a parallel array fuse 172. Fuse 172 includes a long face 174, a short face 176, and a pair of side faces 178 and 180, which have approximately the same length. Fuse 172 has a substantially trapezoidal shape. Leads 164 and 166 are electrically connected to fuse 172 at side faces 178 and 180, respectively. Those skilled in the art will recognize that other shapes are possible without departing from the spirit or scope of the present invention.

Fuse 172 is electrically removable by passing a shunt removal current between leads 164 and 166. Fuse 172 will begin to breakdown at short face 176. Breakdown of fuse 172 will progress across from short face 176 to long face 174 until an open circuit is effectively created in fuse 172. In this embodiment, fuse 172 is a quasi-parallel array. This quasi-parallel array has a sufficiently long breakdown time such that the shunt removal current does not create a damaging current in sensor element 48, the breakdown time being greater than about 10 nanoseconds.

Shunt 42 is formed on transducing head 44 during wafer-level manufacturing using well-known deposition techniques. Further manufacturing processes, for example physical or chemical etching, may also be used to form shunt 42.

Sensor element 48 is vulnerable to ESD and/or EOS damage during fabrications of the HDD whenever a shunt is not formed. In order to enhance ESD and/or EOS protection to sensor element 48, shunt 42 is preferably deposited on transducing head 44 before or soon after sensor element 48 is installed. Shunt 42 is installed by electrically connecting sensor element 48 and shunt 42, preferably immediately after formation of sensor element 48. In addition, shunt 42 preferably remains installed in transducing head 44 after wafer-level manufacturing. Transducing head 44 remains vulnerable to ESD and/or EOS damage during fabrication, including head gimbal assembly (HGA). Shunt 42 may be removed at essentially any time during fabrication, but preferably shunt 42 is removed after HGA assembly and before HSA assembly.

Figure 23:
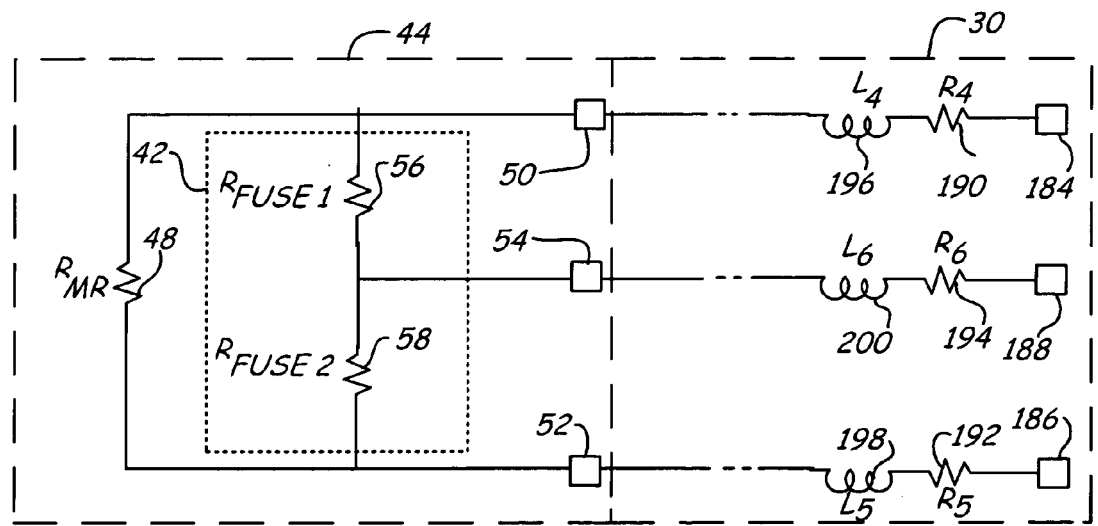
FIG. 23 is a schematic representation of transducing head and a connecting circuit.

FIG. 23 is a schematic representation of transducing head 44 and a connecting circuit, such as flex-on-suspension (FOS) 30. As shown in FIG. 1, FOS 30 electrically connects transducing head 44, mounted on a slider, to HDD components located on or behind an actuator arm, such as a preamp. Referring again to FIG. 23, FOS 30 includes a fourth terminal pad 184, a fifth terminal pad 186, and a sixth terminal pad 188, terminal pads 184–188 being electrically connected to transducing head 44 at first, second and third terminal pads 50, 52 and 54, respectively. FOS 30 further includes a number of leads or traces, each lead having a parasitic resistance ($R_4$, $R_5$, $R_6$) indicated as resistors 190, 192 and 194, and inductance ($L_4$, $L_5$, $L_6$) indicated as inductors 196, 198, 200. Because the leads of FOS 30 are typically long relative to dimensions of transducing head 44, the parasitic resistances 190, 192, and 194 ($R_4$, $R_5$, $R_6$) and inductances 196, 198, and 200 ($L_4$, $L_5$, $L_6$) are significant.

Transducing head 44 is connected to FOS 30 during HGA assembly. Terminal pads 184–188 allow a testing or removal apparatus, such as that shown and described above with respect to previous embodiments, to be electrically connected to the transducing head 44. The configuration shown in FIG. 23 permits shunt 42 to remain installed in transducing head 44 after wafer-level fabrication. This provides numerous advantages, including ESD and/or EOS protection during HGA and HSA assembly. Shunt 42 is permanently electrically removed prior to operation of the HDD.

The testing or removal apparatus is generally configured to physically attach or detach from contact with terminal pads 50–54 or 184–188. However, in a further embodiment, the removal apparatus is incorporated into the preamp. The preamp is typically electrically connected to transducing head 44 during HSA assembly as a matter of course. Those skilled in the art will recognize that the preamp can be easily modified to include components capable of sending a shunt removal current to shunt 42.

Figure 24:
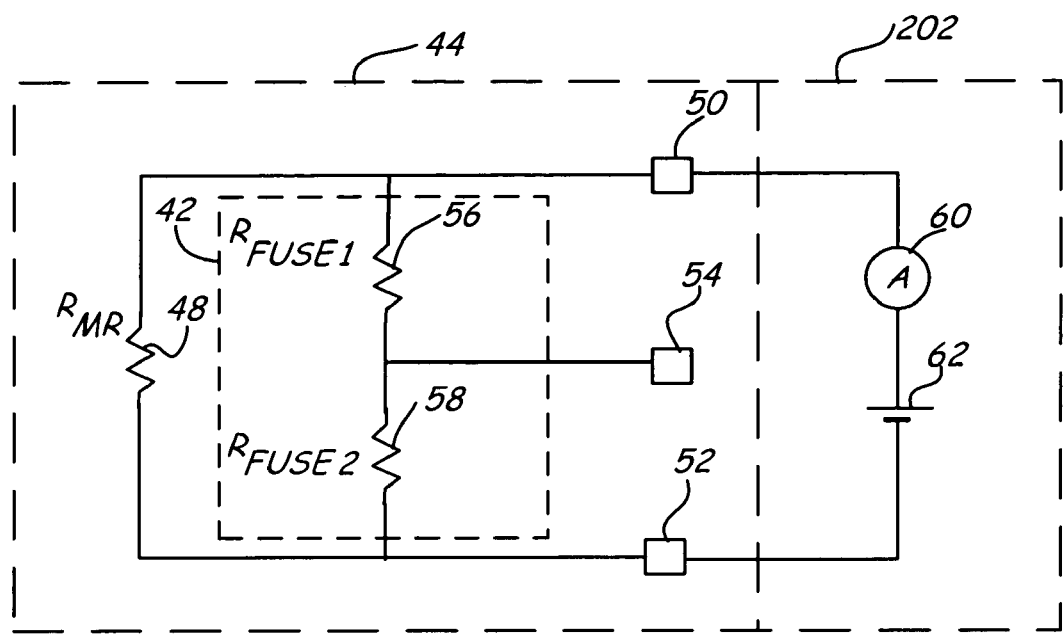
FIG. 24 is a schematic representation of another embodiment of a transducing head circuit.

An eleventh embodiment of transducing head 44 of the present invention is shown in FIG. 24. A testing apparatus 202 is electrically connected to transducing head 44 at terminal pads 50 and 52. Fuses 56 and 58 are formed of a material having a sufficiently low temperature coefficient of resistance (TCR) such that a resistive effect of shunt 42 is substantially constant during fabrication and testing of transducing head 44 and prior to removal of shunt 42. In this embodiment, the sensor element 48 and the fuse elements 56 and 58 are deposited on transducing head 44 during wafer-level fabrication but are not electrically connected. Resistances ($R_{Fuse\ 1}$, $R_{Fuse\ 2}$) of fuses 56 and 58 are measured prior to electrically connecting sensor element 48 with fuses 56 and 58. Sensor element 48 and fuses 56 and 58 are then electrically connected by depositing leads or traces on transducing head 44.

In this embodiment, use of an op-amp is not required. A test current applied between terminal pads 50 and 52 measures a total resistive effect of transducing head 44. A calculation is then made to back out the resistive effects of fuses 56 and 58 from the total resistive effect of transducing head 44 to characterize a resistive effect of sensor element 48 ($R_{MR}$).

Figure 25:
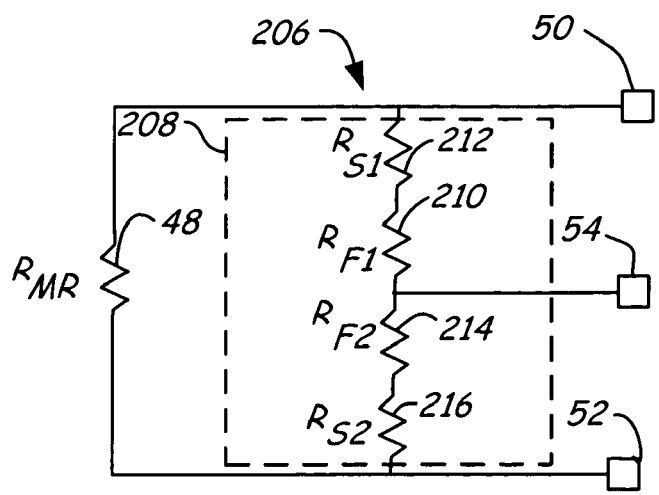
FIG. 25 is a schematic representation of another embodiment of a transducing head circuit.

A twelfth embodiment is shown in FIG. 25, which is a schematic representation of a transducing head 206 having a shunt 208 connected to sensor element 48 in parallel. Shunt 208 includes a first fusing resistor 210 having a resistance $R_{F1}$ and a first shunting resistor 212 having a resistance $R_{S1}$ connected in series, and a second fusing resistor 214 having a resistance $R_{F2}$ and a second shunting resistor 216 having a resistance $R_{S2}$ connected in series, wherein electrical removal of first or second fusing resistor 210 or 214 effectively removes first or second shunting resistor 212 or 216, respectively. In this manner, application of a shunt removal current to shunt 208 effectively creates an open circuit in shunting resistor 212 or 216 by creating an open circuit in fusing resistor 210 or 214, respectively.

Fusing resistors 210 and 214 are uncoupled from shunting resistors 212 and 216, meaning that fusing resistors 210 and 214 are capable of removal independent of shunting resistors 212 and 216. Fusing resistors 210 and 214 have resistances $R_{F1}$, and $R_{F2}$, which are typically much lower than resistances $R_{S1}$ and $R_{S2}$ of shunting resistors 212 and 216. For example, $R_{F1}$ and $R_{F2}$ are both about 1Ω and $R_{S1}$, and $R_{S2}$ are both about 10Ω.

A resistor designed for permanent electrical removal may have greater variance in its resistance than a typical resistor. It may be possible to build shunting resistors 212 and 216 to have precisely controlled resistances $R_{S1}$ and $R_{S2}$. However, there may be great variability in resistances $R_{F1}$ and $R_{F2}$ of fusing resistors 210 and 214. Decoupling fusing resistors 210 and 214 from shunting resistors 212 and 216 has numerous advantages. Variability in resistances $R_{F1}$ and $R_{F2}$ of fusing resistors 210 and 214 have less adverse impact on an overall resistive effect of shunt 208 when decoupled from shunting resistors 212 and 216.

Figure 26:
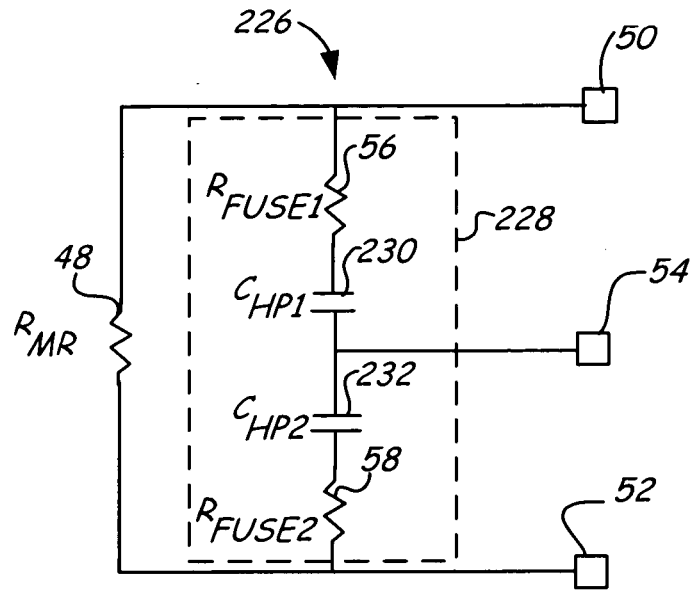
FIG. 26 is a schematic representation of another embodiment of a transducing head.

In a thirteenth embodiment of the present invention, shown in FIG. 26, a transducing head 226 includes a high pass shunt 288, which has a high frequency impedance and a low frequency impedance, and wherein the high frequency impedance and the low frequency impedance are not equal. Shunt 228 includes first and second resistors 56 and 58 ($R_{Fuse\ 1}$ and $R_{Fuse\ 2}$), and a first capacitor 230 having a capacitance $C_{HP1}$ and a second capacitor 232 having a capacitance $C_{HP1}$. $C_{HP1}$ and $C_{HP2}$ are each substantially equal to a capacitance value C. $R_{Fuse\ 1}$ and $R_{Fuse\ 2}$ are each substantially equal to a resistance value $R_{Fuse}$. Shunt 228 is electrically connected to sensor element 48 in parallel. First and second capacitors 230 and 232 and first and second resistors 56 and 58 are connected in series. In further embodiments, only one capacitor is used.

Shunt 228 is a high pass shunt, meaning typically only relatively high frequency current flows through shunt 228. Shunt 228 has a relatively high impedance ($Z_{LF}$) at low frequencies ($f_{Low}$), such that: $f_{Low} \ll 1/(R_{Fuse} \cdot C)$. At high frequencies ($f_{High}$), such as where $f_{High}$ is greater than 100 MHz, shunt 228 has a relatively low impedance ($Z_{HF}$), such that: $|Z_{HF}| \sim 2R_{Fuse}$. Currents typically flow through shunt 228 only at relatively high frequencies where shunt 228 has a relatively low impedance.

Figure 27:
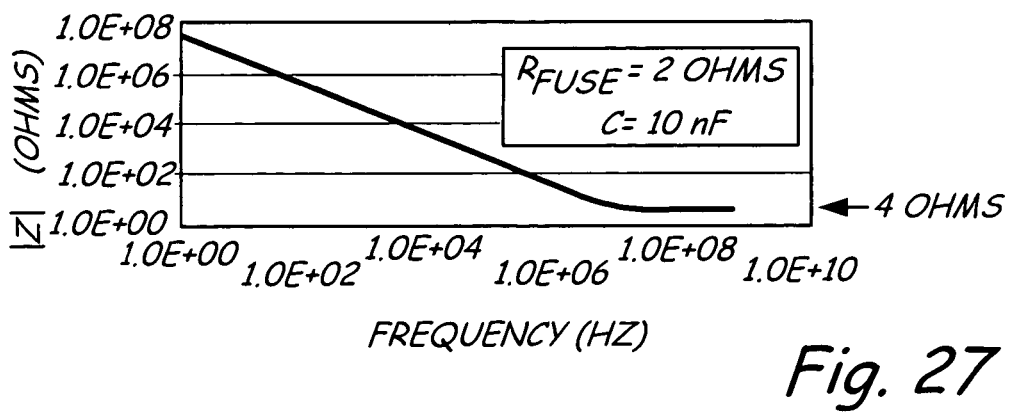
FIG. 27 is a graph representing an impedance of the shunt of FIG. 26 versus a frequency of an applied current.

FIG. 27 is a graph representing an impedance |Z| in Ohms of shunt 228 versus a frequency in Hertz (Hz) of any applied current. As shown in FIG. 27, for illustrative purposes only, C has a value of 10 nanofarads (nF) and $R_{fuse}$ has a value of 2Ω. Other values of C and $R_{fuse}$ are possible, in accordance with the description of shunt 228 above. |Z| decreases as frequency increases. At relatively high frequencies, for the given values of C and $R_{fuse}$, |Z| approaches about 4Ω.

ESD and/or EOS events typically occur as high frequency transient currents. The low impedance ($Z_{HF}$) of shunt 228 at high frequencies ($f_{High}$) allows high frequency current, such as typical ESD and/or EOS currents, to flow through shunt 228 rather than through sensor element 48. However, the high impedance ($Z_{LF}$) of shunt 228 at low frequencies ($f_{Low}$) allows low frequency current to flow through sensor element 48 without significant current flowing through shunt 228, thereby allowing testing of sensor element 48 with a low frequency test current while shunt 228 is installed in transducing head 226. Adverse effects of high pass shunt 228 on testing procedures are reduced when sensor element 48 is tested with the low frequency test current.

Sensor element 48 is tested using a test apparatus, as described above with respect to the previous embodiments. The test current is applied at frequency $f_{Low}$. Testing allows characterization of electrical properties of sensor element 48 to determine if sensor element 48 is capable or proper operation.

Shunt 228 is permanently electrically removable by applying a high frequency ($f_{Removal}$) AC shunt removal current to shunt 228 through third terminal pad 54, such that: $f_{Removal} \geq 1/(R_{Fuse} \cdot C)$. Because the shunt removal current has a high frequency, the low impedance of shunt 228 at high frequencies allows the shunt removal current to flow to shunt 228. The shunt removal current then removes shunt 228 in the manner discussed above with respect to the previous embodiments.

Figure 28:
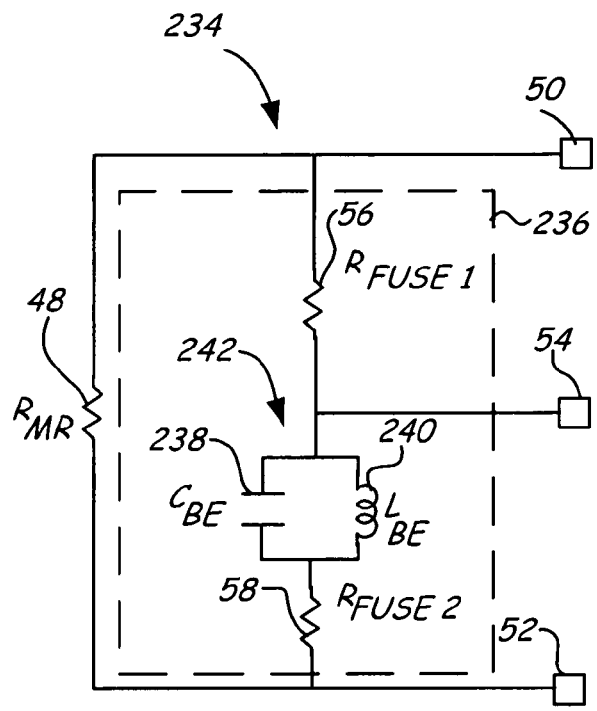
FIG. 28 is a schematic representation of another embodiment of a transducing head.

In a fourteenth embodiment of the present invention, shown in FIG. 28, a transducing head 234 includes a band exclude shunt 236. Shunt 236 is structured to have a high impedance ($Z_{notch}$) at a testing frequency ($f_{notch}$) and a low impedance ($Z_S$) at frequencies greater than the testing frequency and less than the testing frequency, for allowing testing of the transducing head at the testing frequency and pulses at other frequencies. Shunt 236 includes first and second fuses 56 and 58 ($R_{Fuse\ 1}$ and $R_{Fuse\ 2}$), a capacitor 238 having a capacitance $C_{BE}$, and an inductor 240 having an inductance $L_{BE}$. $R_{Fuse\ 1}$ and $R_{Fuse\ 2}$ are each substantially equal to a resistance value $R_{Fuse}$. Shunt 236 is electrically connected to sensor element 48 in parallel. Capacitor 238 and inductor 240 are electrically connected in a parallel connection, the parallel connection being electrically connected to fuses 56 and 58 in series. Shunt 236 is electrically connected to sensor element 48 in parallel.

Shunt 236 has a high impedance $Z_{notch}$ at the test frequency $f_{notch}$, such that $Z_{notch}$ approaches an infinite resistance ($Z_{notch} \to \infty \Omega$). The test frequency $f_{notch}$ is characterized as:

$$f_{notch} = \frac{1}{2\pi\sqrt{L_{BE} \cdot C_{BE}}}$$

At frequencies significantly above and significantly below $f_{notch}$, shunt 236 has a relatively low impedance $Z_S$, such that: $|Z_S| \sim 2R_{Fuse}$.

Figure 29:
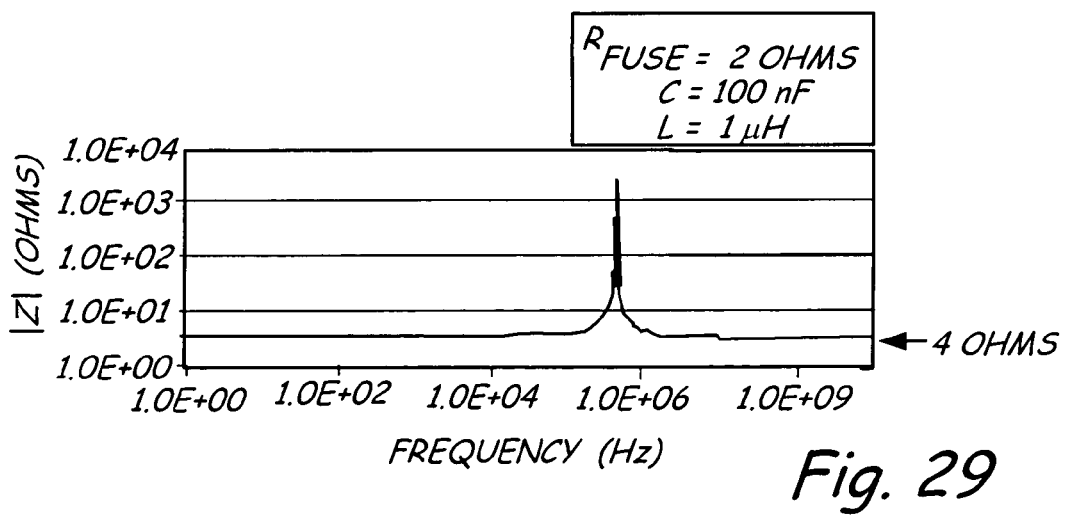
FIG. 29 is a graph representing an impedance |Z| in Ohms of shunt 236 versus a frequency in Hertz (Hz) of an applied current.

FIG. 29 is a graph representing an impedance $|Z|$ in Ohms of shunt 236 versus a frequency in Hertz (Hz) of any applied current. As shown in FIG. 29, for illustrative purposes only, C has a value of 100 nanofarads (nF), L has a value of 1 microhenry (µH) and $R_{fuse}$ has a value of 2Ω. Other values of C and $R_{fuse}$ are possible, in accordance with the description of shunt 228 above. $|Z|$ is relatively constant at about 4Ω, however $|Z|$ is significantly greater at frequency $f_{notch}$. At relatively high frequencies, for the given values of C and $R_{fuse}$, $|Z|$ approaches about 4Ω.

ESD and/or EOS events typically occur as high frequency transient currents, such as transient currents having frequencies greater than 100 MHz. The low impedance ($Z_S$) of shunt 236 at frequencies significantly above and significantly below $f_{notch}$ allows, for example, high frequency current (e.g. typical ESD and/or EOS currents) to flow through shunt 236 rather than through sensor element 48. However, the high impedance ($Z_{notch}$) of shunt 236 at the test frequency $f_{notch}$ allows a test current at the test frequency $f_{notch}$ to flow through sensor element 48 without significant current flowing through shunt 236, which allows testing of sensor element 48 while shunt 236 is installed in transducing head 234. Adverse effects of band exclude shunt 236 on testing procedures are reduced when sensor element 48 is tested with a test current having a frequency about equal to $f_{notch}$.

Sensor element 48 is tested using a test apparatus, as described above with respect to the previous embodiments. The test current is applied at frequency $f_{notch}$. Testing allows characterization of electrical properties of sensor element 48 to determine if sensor element 48 is capable of proper operation.

Shunt 236 is permanently electrically removed by applying a DC shunt removal current to shunt 236 through third terminal pad 54. The shunt removal current removes fuses 56 and 58 in the manner described with respect to the previous embodiments. In one embodiment, the shunt removal current has a frequency significantly higher than $f_{notch}$. However, the shunt removal current need not have a relatively high frequency, but may be at any frequency significantly lower or significantly higher than $f_{notch}$.

Although the present invention has been described with reference to preferred embodiments, workers skilled in the art will recognize that changes may be made in form and detail without departing from the spirit and scope of the invention.

The invention claimed is:

1. A transducing head comprising:
   a sensor element having a plurality of terminal pads; and
   a shunt electrically connected with the sensor element in parallel for protecting the sensor element from electrical damage during fabrication of the transducing head, wherein the shunt comprises one or more fuses, the shunt configured to be repeatedly tested around during fabrication to allow testing of the sensor element, and wherein the shunt is structured to be permanently electrically removable prior to operation of the transducing head by directing a shunt removal current through the shunt which effectively creates an open circuit in the shunt without causing a damaging current to flow in the sensor element.

2. The apparatus of claim 1 wherein each fuse has a breakdown time, wherein the breakdown time is sufficiently long that a change to an impedance of the fuse during removal of the shunt does not create a damaging current surge through the sensor element.

3. The transducing head of claim 2 wherein the breakdown time of each fuse is greater than about 10 nanoseconds.

4. The transducing head of claim 1 wherein the fuses are formed of multi-layer material.

5. The transducing head of claim 4 wherein the multi-layer material includes a first resistive material having a resistance $R_1$ and a second resistive material having a resistance $R_2$, the first and second resistive materials being arranged in parallel, and wherein breakdown of the fuse forms an alloy of the first and second resistive materials, the alloy having a resistance $R_A$, where $R_1 \| R_2 < R_A$.

6. The transducing head of claim 4 wherein the multi-layer material includes a first resistive material having a resistance $R_1$ and a second resistive material having a resistance $R_2$, the first and second resistive materials being arranged in parallel, and wherein breakdown of the fuse causes diffusion of the first and second resistive materials, the fuse having a post-diffusion resistance $R_D$, where $R_1 \| R_2 < R_D$.

7. The transducing head of claim 1 wherein the fuses are formed of material that sublimes in response to the shunt removal current.

8. The transducing head of claim 7 further comprising a cavity for capturing fuse material as the fuses sublime.

9. The transducing head of claim 7 further comprising a cavity, wherein the fuses are disposed substantially inside the cavity.

10. The transducing head of claim 7 wherein the fuses are formed of Cr.

11. The transducing head of claim 1 wherein each fuse comprises a rectangular thin film resistor having a resistance, a breakdown voltage, a breakdown time, a length, and a width, the length and width configured such that the breakdown time for the given resistance and breakdown voltage of the fuse is sufficiently long.

12. The transducing head of claim 1 wherein the shunt comprises a plurality of fuses connected in a parallel array, the parallel array having a longer breakdown time than any one of the fuses when the fuses are removed sequentially.

13. The transducing head of claim 1 wherein each fuse has a high temperature coefficient of resistance, such that heat generated by the shunt removal current increases a resistance of the fuse over a sufficiently long period of time prior to breakdown of the fuse.

14. The transducing head of claim 1 wherein the fuse is formed of Ni.

15. The transducing head of claim 1 wherein the shunt includes a fusing resistor and a shunting resistor connected in series, wherein electrical removal of the fusing resistor effectively removes the shunting resistor.

16. The transducing head of claim 1 wherein the transducing head includes a heat sink, the heat sink positioned adjacent the shunt and being electrically insulated from the shunt.

17. The transducing head of claim 1 wherein application of the shunt removal current to the shunt effectively creates an open circuit in one of the fuses and then effectively creates an open circuit in another fuse.

18. The transducing head of claim 1 wherein at least one of the fuses includes a fusing resistor and a shunting resistor, the fusing resistor and the shunting resistor electrically connected in series, and wherein application of the shunt removal current to the shunt effectively creates an open circuit in the shunting resistor by creating an open circuit in the fusing resistor.

19. The transducing head of claim 1 wherein the fuses are connected in a quasi-parallel array, the quasi-parallel array having a longer breakdown time than any one of the fuses when the fuses are removed sequentially.

20. The transducing head of claim 1 wherein the fuses are formed of resistive material having a sufficiently low temperature coefficient of resistance such that a resistive effect of the shunt is substantially constant during fabrication and testing of the transducing head prior to removal of the shunt.

21. The transducing head of claim 1 wherein the shunt is structured to have a high frequency impedance and a low frequency impedance, and wherein the high frequency impedance and the low frequency impedance are not equal.

22. The transducing head of claim 1 wherein the shunt further includes a capacitor electrically connected to the fuses in series.

23. The transducing head of claim 1 wherein the shunt further comprises a capacitor and an inductor electrically connected by a parallel connection, the parallel connection being electrically connected to the fuses in series.

24. The transducing head of claim 1, wherein the shunt is structured to have a high impedance at a testing frequency and a low impedance at frequencies greater than the testing frequency and less than the testing frequency, for allowing testing of the transducing head at the testing frequency and pulses at other frequencies.

25. The transducing head of claim 1 wherein resistances of the fuses are selected such that a damaging current is not created in the sensor element.

26. The transducing head of claim 1 wherein the shunt removal current has a voltage which increases over time as the shunt removal current is applied to the shunt.

27. The transducing head of claim 1 wherein the shunt removal current originates from a preamp electrically connected to the transducing head.

28. A transducing head comprising:
  a sensor element having a plurality of terminal pads and a sensor resistance;
  a shunt electrically connected with the sensor element in parallel, the shunt including a plurality of removable resistive elements, each resistive element having an element resistance; and
  an adjustable transducing head resistance defined by the sensor resistance and the element resistances, wherein sequential removal of some or all of the resistive elements establishes a desired transducing head resistance.

29. A transducing head assembly comprising:
  a sensor element;
  a first terminal pad and a second terminal pad electrically connected to the sensor element; and
  a shunt connected in parallel to the sensor element, the shunt including a first fuse, a second fuse, and a third terminal pad electrically connected between the first and second fuses, wherein the third terminal pad accepts current for temporary bypassing of the shunt and for permanent electrical removal of the shunt by directing a shunt removal current through the shunt which non-simultaneously effectively creates an open circuit in the first and second fuses, while at no point during electrical removal of the shunt is current in the sensor element permitted to reach a damaging level.

30. A transducing head assembly with electrical damage protection comprising:
  a sensor element;
  a first terminal pad and a second terminal pad electrically connected to the sensor element; and
  shunting means connected in parallel to the sensor element for protecting the sensor element from electrical damage during fabrication of the transducing head assembly, the shunting means permitting repeated testing of the sensor element and being permanently electrically removable by a shunt removal current without causing a damaging inductive current through the sensor element.

* * * * *